United States Patent
Suzuki et al.

(10) Patent No.: US 10,549,638 B2
(45) Date of Patent: Feb. 4, 2020

(54) INFORMATION DISPLAY APPARATUS, INFORMATION PROVISION SYSTEM, MOVING OBJECT DEVICE, INFORMATION DISPLAY METHOD, AND RECORDING MEDIUM

(71) Applicants: Yuuki Suzuki, Kanagawa (JP);
Kenichiroh Saisho, Tokyo (JP);
Masato Kusanagi, Kanagawa (JP);
Takuro Yasuda, Kanagawa (JP);
Kazuhiro Fujita, Tokyo (JP)

(72) Inventors: Yuuki Suzuki, Kanagawa (JP);
Kenichiroh Saisho, Tokyo (JP);
Masato Kusanagi, Kanagawa (JP);
Takuro Yasuda, Kanagawa (JP);
Kazuhiro Fujita, Tokyo (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 15/758,810

(22) PCT Filed: Sep. 13, 2016

(86) PCT No.: PCT/JP2016/004167
§ 371 (c)(1),
(2) Date: Mar. 9, 2018

(87) PCT Pub. No.: WO2017/047079
PCT Pub. Date: Mar. 23, 2017

(65) Prior Publication Data
US 2019/0084419 A1    Mar. 21, 2019

(30) Foreign Application Priority Data
Sep. 18, 2015 (JP) .................. 2015-185240

(51) Int. Cl.
*B60K 35/00* (2006.01)
*G02B 27/01* (2006.01)

(52) U.S. Cl.
CPC .......... *B60K 35/00* (2013.01); *G02B 27/0101* (2013.01); *B60K 2370/1531* (2019.05);
(Continued)

(58) Field of Classification Search
CPC ..... B60K 35/00; G02B 27/01; G02B 27/0101
See application file for complete search history.

(56) References Cited

U.S. PATENT DOCUMENTS 5,726,704 A * 3/1998 Uomori ................ H04N 13/376
348/47
7,417,777 B2 8/2008 Saisho et al.
(Continued)

FOREIGN PATENT DOCUMENTS

EP    3 031 656 A1    6/2016
JP    H11-202256    7/1999
(Continued)

OTHER PUBLICATIONS

International Search Report dated Aug. 23, 2017 in PCT/JP2017/009689 filed on Mar. 10, 2017, 5 pages.
(Continued)

*Primary Examiner* — Sarah Lhymn
(74) *Attorney, Agent, or Firm* — Oblon, McClelland, Maier & Neustadt, L.L.P.

(57) ABSTRACT

An information display apparatus emits an image forming light beam to a transmissive reflection member and makes a virtual image visible through the reflection member. The information display apparatus is configured to display the virtual image so that a difference between a convergence angle when viewing the virtual image through the reflection member and a convergence angle when viewing a real object
(Continued)

through the reflection member is less than or equal to 1 degree.

21 Claims, 23 Drawing Sheets

(52) U.S. Cl.
CPC .. *B60K 2370/186* (2019.05); *B60K 2370/334* (2019.05); *B60K 2370/349* (2019.05); *B60K 2370/52* (2019.05); *B60K 2370/736* (2019.05); *G02B 2027/0134* (2013.01); *G02B 2027/0138* (2013.01); *G02B 2027/0145* (2013.01)

(56) References Cited

U.S. PATENT DOCUMENTS

| | | | |
|---|---|---|---|
| 7,616,364 B2 | 11/2009 | Saisho et al. | |
| 7,663,657 B2 | 2/2010 | Ichii et al. | |
| 7,672,032 B2 | 3/2010 | Hayashi et al. | |
| 7,688,491 B2 | 3/2010 | Saisho et al. | |
| 7,817,177 B2 | 10/2010 | Hayashi et al. | |
| 7,876,486 B2 | 1/2011 | Saisho et al. | |
| 7,952,808 B2 | 5/2011 | Hotta et al. | |
| 7,973,990 B2 | 7/2011 | Sakai et al. | |
| 8,045,248 B2 | 10/2011 | Watanabe et al. | |
| 8,059,149 B2 | 11/2011 | Saisho et al. | |
| 8,077,369 B2 | 12/2011 | Sakai et al. | |
| 8,190,062 B2 | 5/2012 | Maruyama et al. | |
| 8,213,067 B2 | 7/2012 | Saisho | |
| 8,368,736 B2 | 2/2013 | Saisho et al. | |
| 8,384,953 B2 | 2/2013 | Yamaguchi | |
| 8,531,766 B2 | 9/2013 | Tokita et al. | |
| 8,559,053 B2 | 10/2013 | Saisho et al. | |
| 8,848,013 B2 | 9/2014 | Saisho et al. | |
| 8,876,294 B2 | 11/2014 | Saisho et al. | |
| 8,884,975 B2 | 11/2014 | Satoh et al. | |
| 9,041,944 B2 | 5/2015 | Umezawa et al. | |
| 9,158,124 B2 | 10/2015 | Saisho et al. | |
| RE45,918 E | 3/2016 | Saisho K et al. | |
| 9,514,718 B2 | 12/2016 | Itoh et al. | |
| 9,544,453 B2 | 1/2017 | Umezawa et al. | |
| 9,637,118 B2 | 5/2017 | Yokota et al. | |
| 9,746,669 B2 | 8/2017 | Saisho et al. | |
| 9,798,140 B2 | 10/2017 | Inamoto et al. | |
| 9,921,460 B2 | 3/2018 | Yamaguchi et al. | |
| 10,031,343 B2 | 7/2018 | Saisho et al. | |
| 2008/0204663 A1* | 8/2008 | Balogh | G02B 27/2214 353/10 |
| 2009/0278765 A1 | 11/2009 | Stringfellow | |
| 2013/0163019 A1 | 6/2013 | Tago et al. | |
| 2014/0036374 A1* | 2/2014 | Lescure | G02B 27/0101 359/630 |
| 2015/0062345 A1 | 3/2015 | Kusanagi | |
| 2015/0070389 A1 | 3/2015 | Goto et al. | |
| 2015/0109429 A1* | 4/2015 | Inoue | A61B 5/18 348/78 |
| 2015/0192992 A1 | 7/2015 | Di Censo et al. | |
| 2015/0332103 A1 | 11/2015 | Yokota et al. | |
| 2015/0370318 A1 | 12/2015 | Yamaguchi et al. | |
| 2016/0161833 A1 | 6/2016 | Watanabe et al. | |
| 2016/0167514 A1 | 6/2016 | Nishizaki et al. | |
| 2016/0170487 A1 | 6/2016 | Saisho | |
| 2016/0284129 A1* | 9/2016 | Nishizawa | G06F 3/013 |
| 2016/0313562 A1 | 10/2016 | Saisho et al. | |
| 2016/0320624 A1 | 11/2016 | Yamaoka | |
| 2018/0096536 A1 | 4/2018 | Goto et al. | |

FOREIGN PATENT DOCUMENTS

| | | |
|---|---|---|
| JP | 2005-301144 | 10/2005 |
| JP | 2010-076533 | 4/2010 |
| JP | 2010-120501 | 6/2010 |
| JP | 2010-173619 | 8/2010 |
| JP | 2012-244187 | 12/2012 |
| JP | 2013-196359 A | 9/2013 |
| JP | 2014-139656 | 7/2014 |
| JP | 2015-45782 A | 3/2015 |
| JP | 2015-225119 A | 12/2015 |
| WO | 2013/069624 | 5/2013 |
| WO | WO 2017/047079 A1 | 3/2017 |

OTHER PUBLICATIONS

Written Opinion of the International Searching Authority dated Aug. 23, 2017 in PCT/JP2017/009689 filed on Mar. 10, 2017, 12 pages.
Extended European Search Report dated Sep. 18, 2018 in Patent Application No. 16845953.5, 9 pages.
U.S. Appl. No. 16/316,288, filed Jan. 8, 2019, Yuuki Suzuki, et al.
International Search Report dated Nov. 22, 2016 in PCT/JP2016/004167 filed on Sep. 13, 2016.
Written Opinion dated Nov. 22, 2016 in PCT/JP2016/004167 filed on Sep. 13, 2016.

* cited by examiner

[Fig. 1]
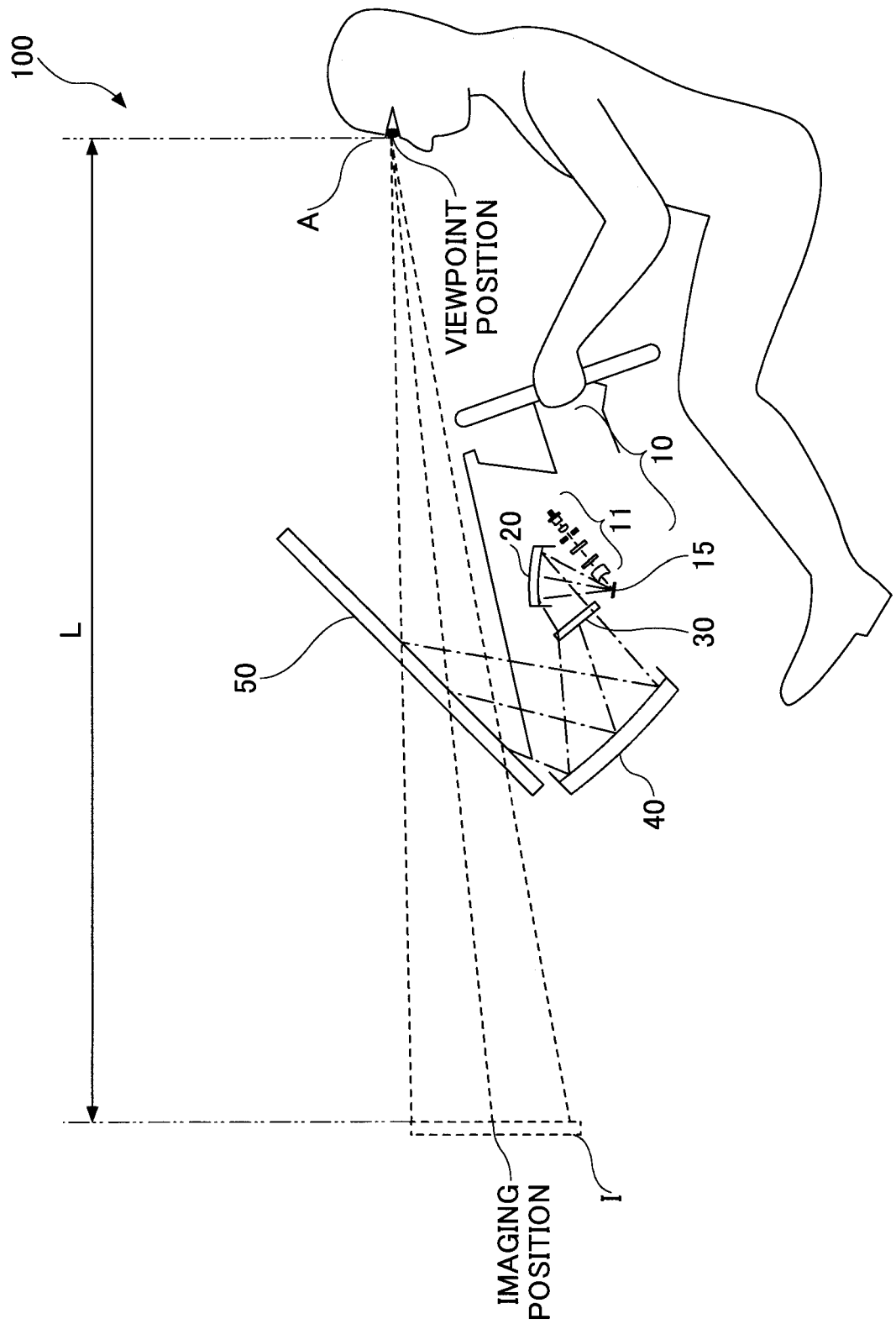

[Fig. 2]
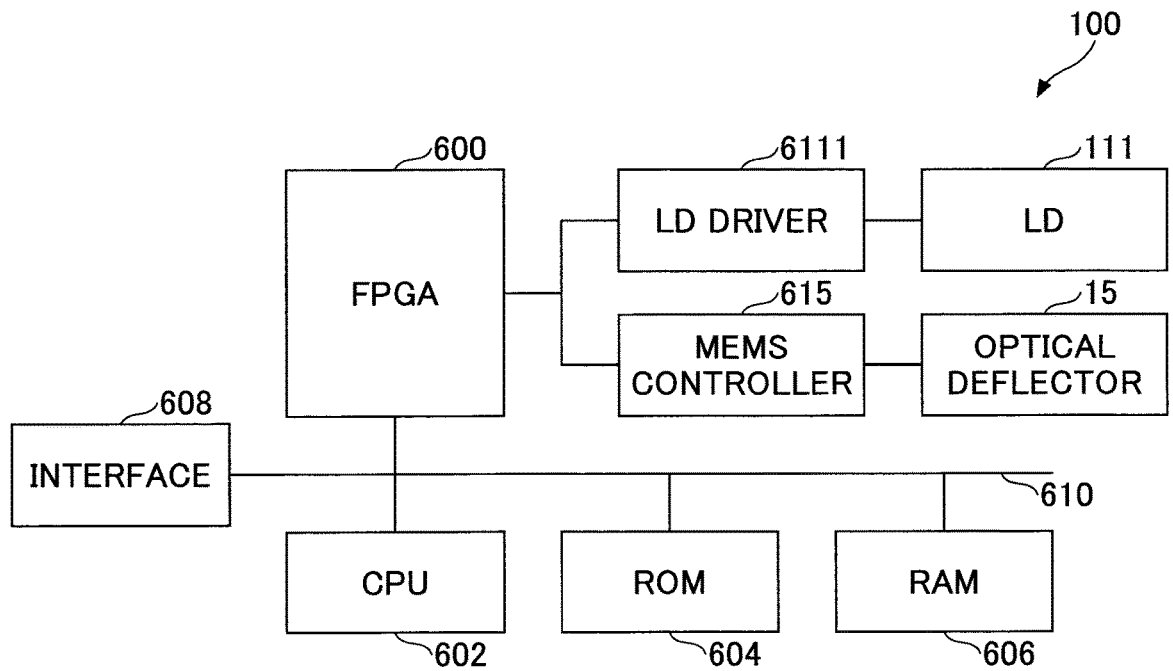
[Fig. 3]
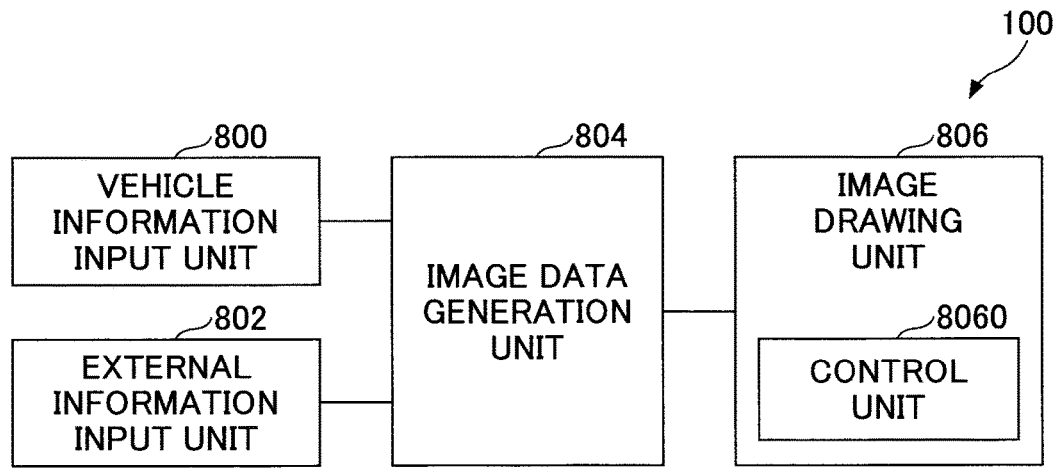

[Fig. 4]
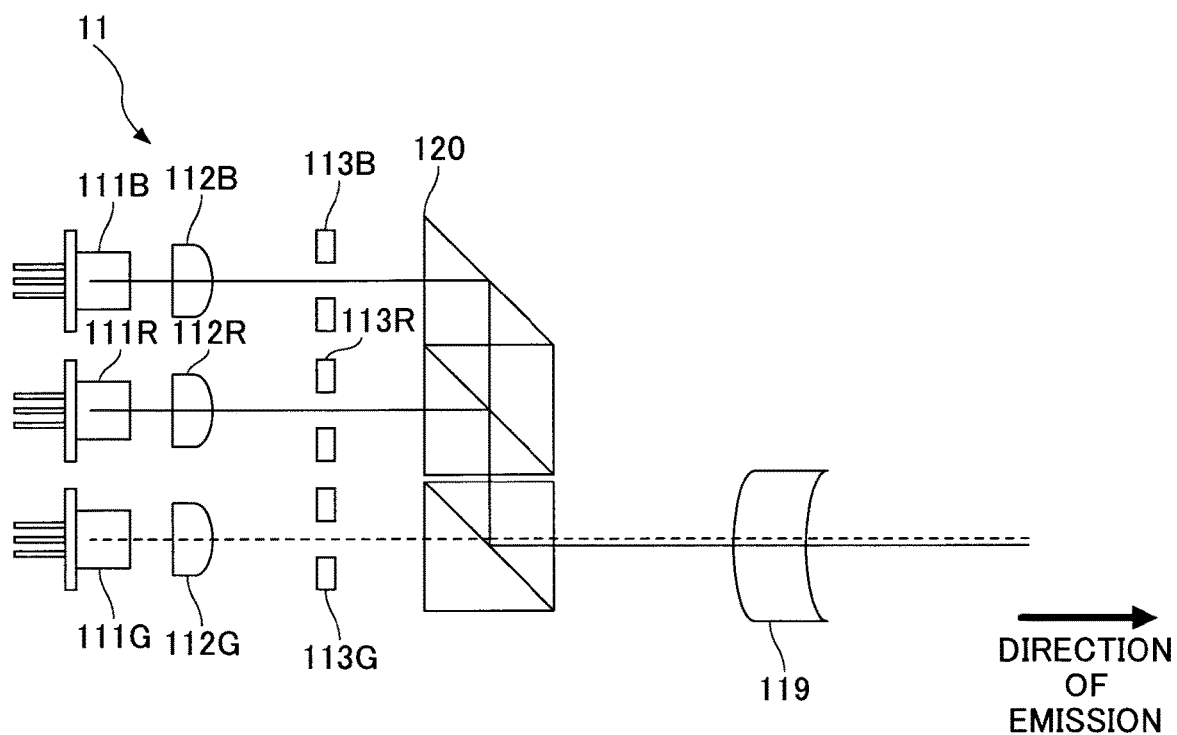

[Fig. 5]
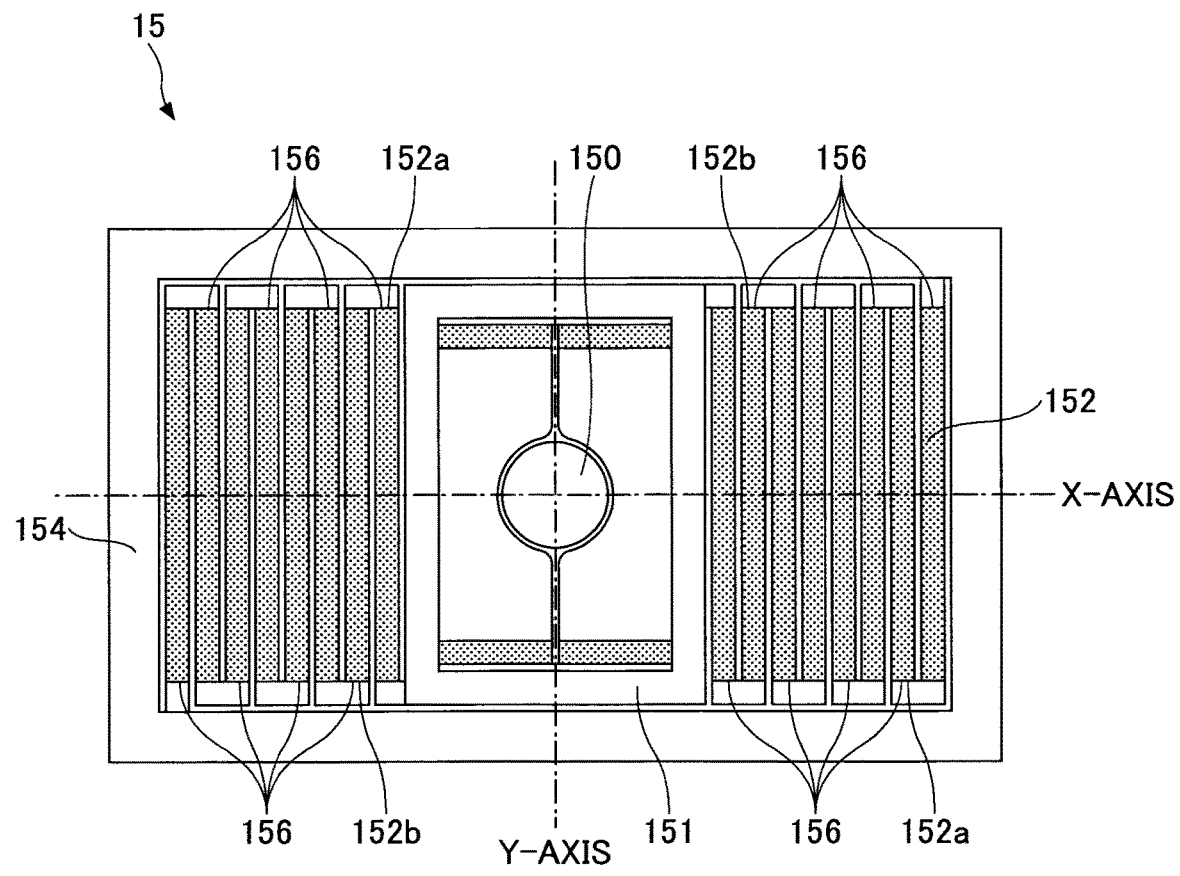

[Fig. 6]
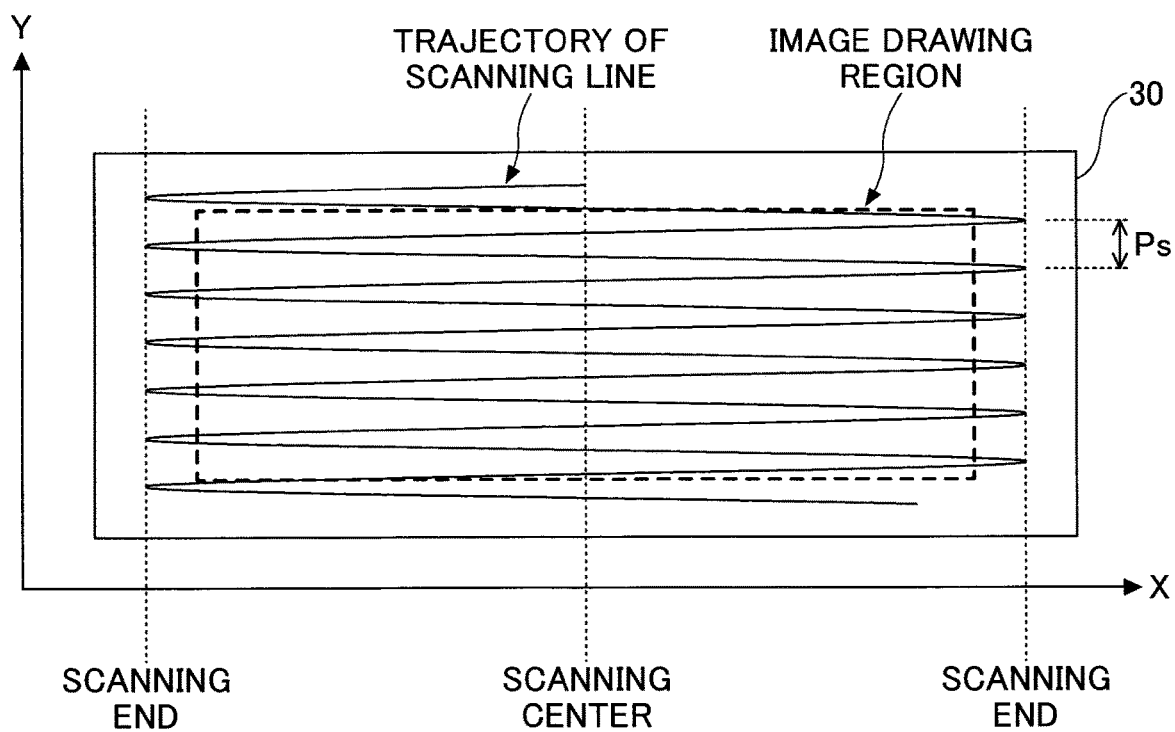

[Fig. 7]
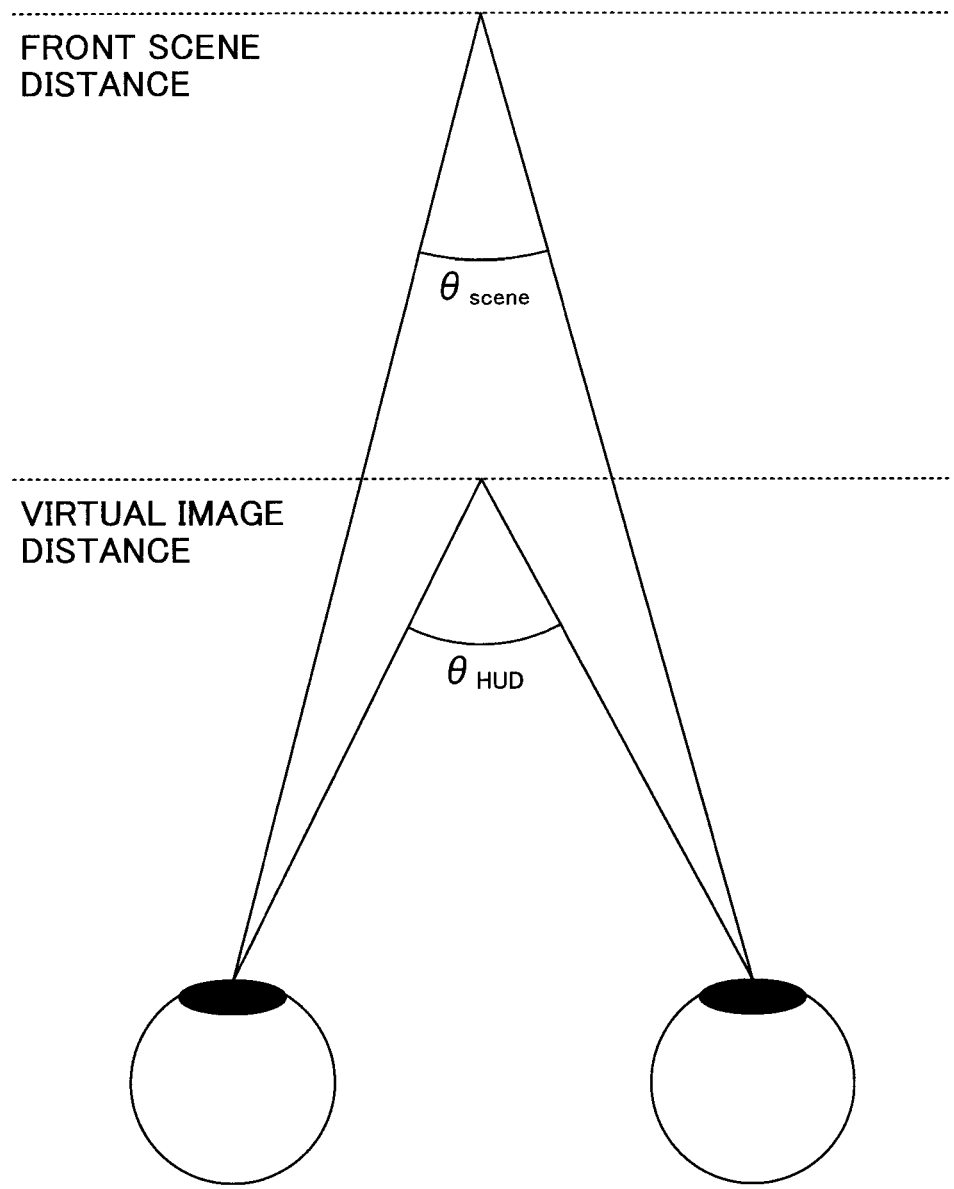

[Fig. 8]

| Distance "L" from viewpoint position to imaging position / Background distance (gazing point) | \multicolumn{6}{c}{PARALLAX ANGLE (DIFFERENCE IN CONVERGENCE ANGLE)} | | | | | |
|---|---|---|---|---|---|---|
| | 2 [m] | 3 [m] | 4 [m] | 6 [m] | 8 [m] | 10 [m] |
| 5 | 1.117 | 0.497 | 0.186 | 0.124 | 0.279 | 0.372 |
| 10 | 1.490 | 0.869 | 0.559 | 0.248 | 0.093 | 0.000 |
| 15 | 1.614 | 0.993 | 0.683 | 0.372 | 0.217 | 0.124 |
| 20 | 1.676 | 1.055 | 0.745 | 0.434 | 0.279 | 0.186 |
| 25 | 1.713 | 1.092 | 0.782 | 0.472 | 0.317 | 0.223 |
| 30 | 1.738 | 1.117 | 0.807 | 0.497 | 0.341 | 0.248 |
| 35 | 1.756 | 1.135 | 0.825 | 0.514 | 0.359 | 0.266 |
| 40 | 1.769 | 1.148 | 0.838 | 0.528 | 0.372 | 0.279 |
| 45 | 1.779 | 1.159 | 0.848 | 0.538 | 0.383 | 0.290 |
| 50 | 1.787 | 1.167 | 0.857 | 0.546 | 0.391 | 0.298 |
| 55 | 1.794 | 1.174 | 0.863 | 0.553 | 0.398 | 0.305 |
| 60 | 1.800 | 1.179 | 0.869 | 0.559 | 0.403 | 0.310 |
| 65 | 1.805 | 1.184 | 0.874 | 0.563 | 0.408 | 0.315 |
| 70 | 1.809 | 1.188 | 0.878 | 0.567 | 0.412 | 0.319 |
| 75 | 1.812 | 1.192 | 0.881 | 0.571 | 0.416 | 0.323 |
| 80 | 1.815 | 1.195 | 0.884 | 0.574 | 0.419 | 0.326 |
| 85 | 1.818 | 1.198 | 0.887 | 0.577 | 0.422 | 0.329 |
| 90 | 1.821 | 1.200 | 0.890 | 0.579 | 0.424 | 0.331 |
| 95 | 1.823 | 1.202 | 0.892 | 0.581 | 0.426 | 0.333 |
| 100 | 1.825 | 1.204 | 0.894 | 0.583 | 0.428 | 0.335 |
| 1000 | 1.858 | 1.238 | 0.927 | 0.617 | 0.462 | 0.369 |

[Fig. 9]
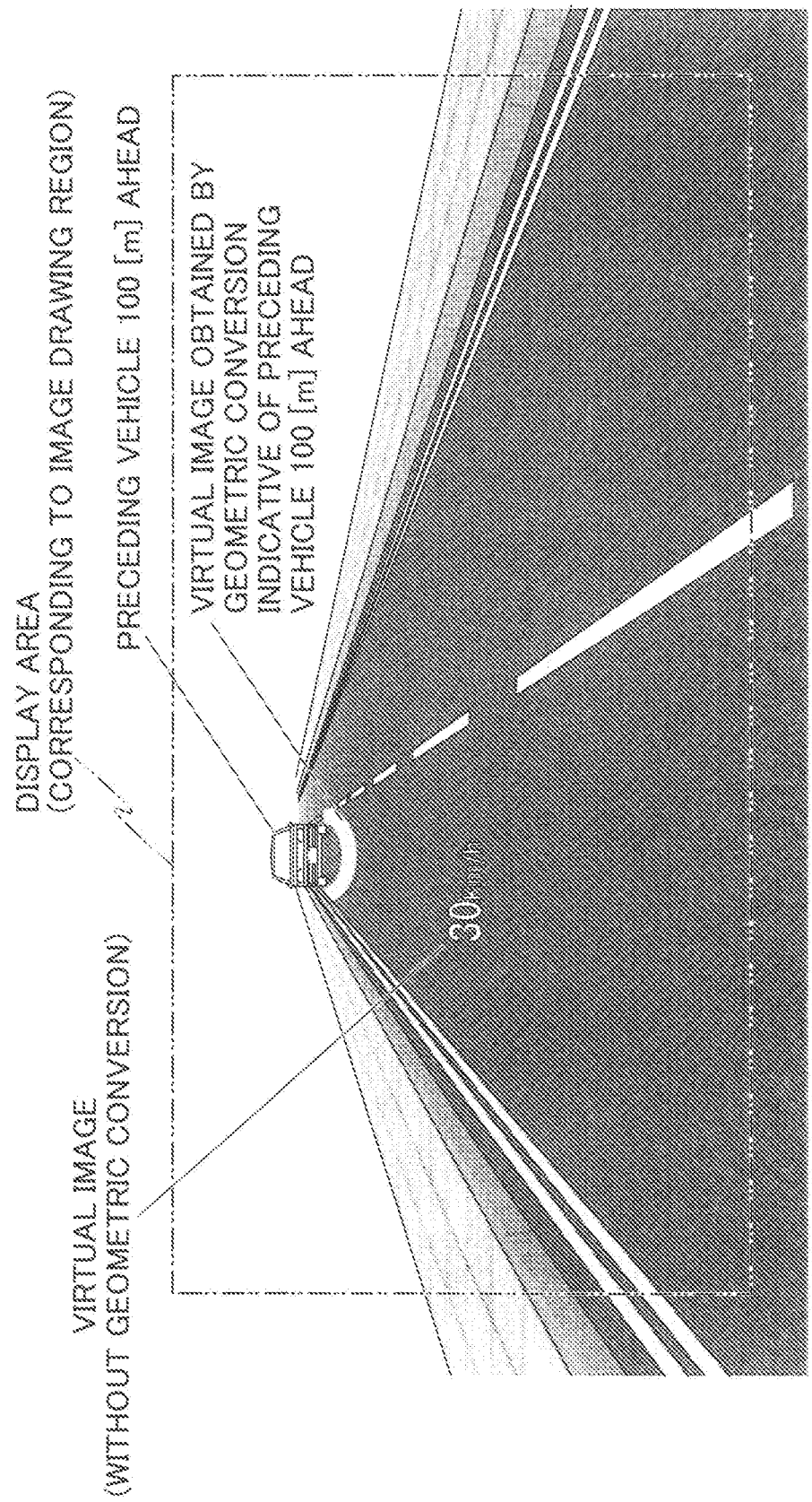

[Fig. 10]
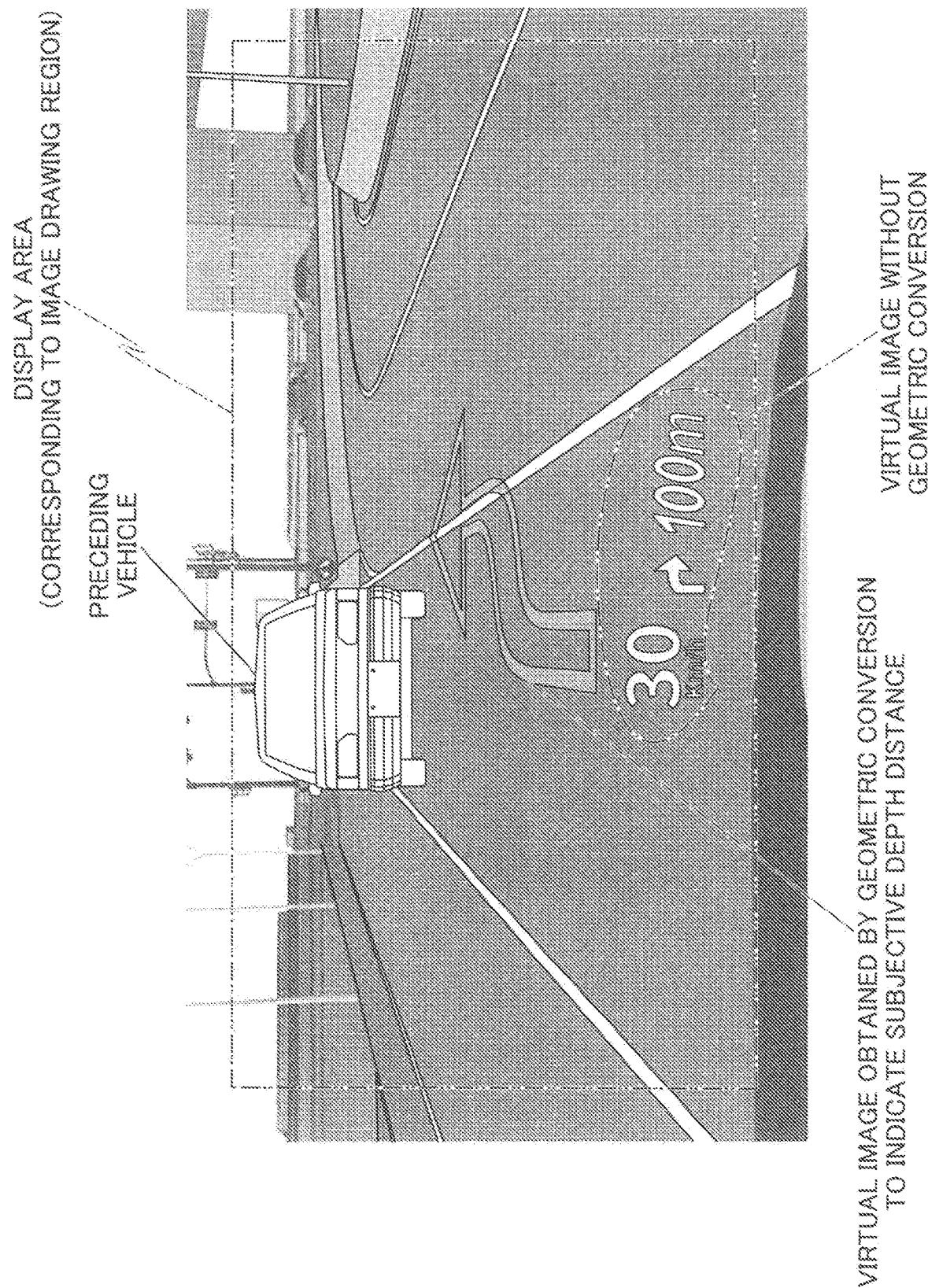

[Fig. 11]
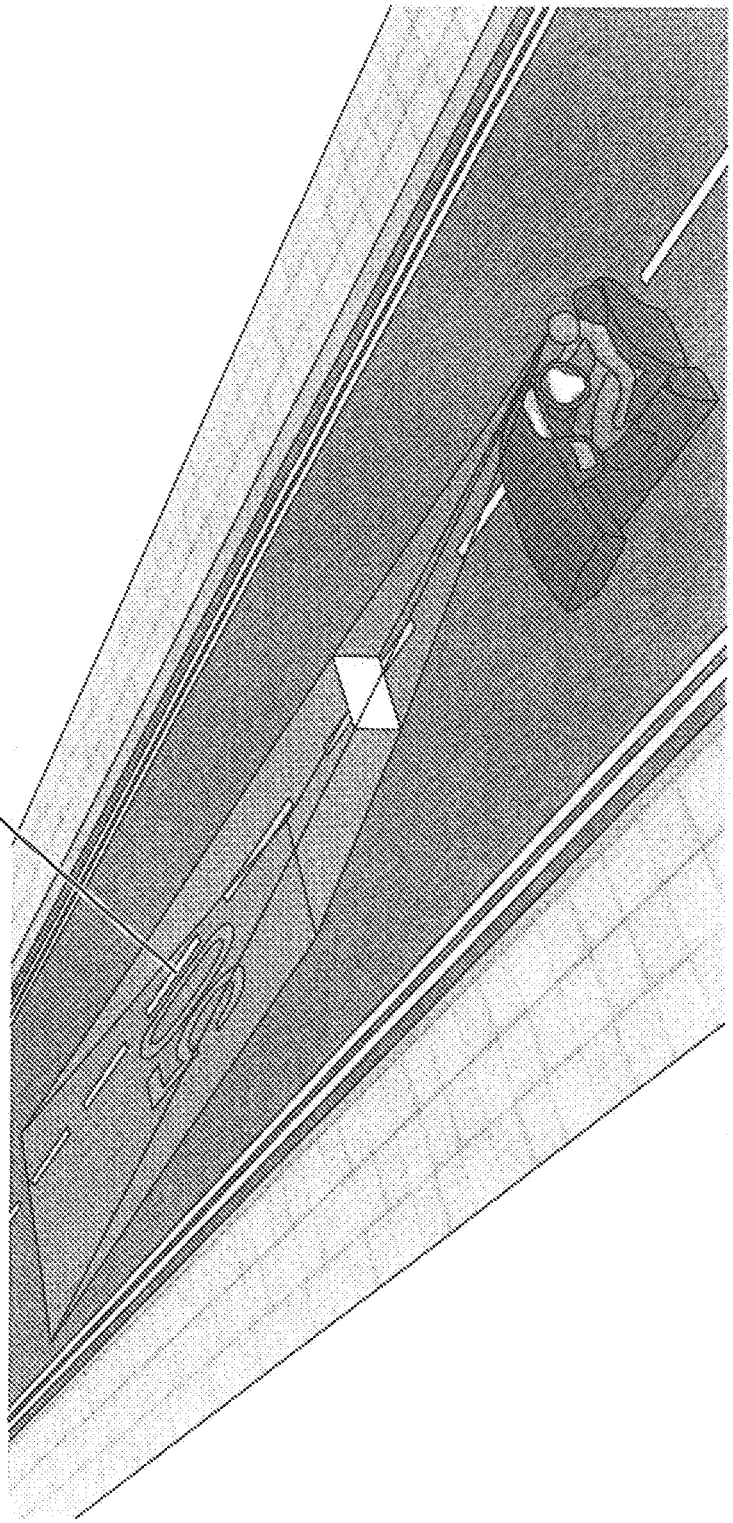

[Fig. 12]
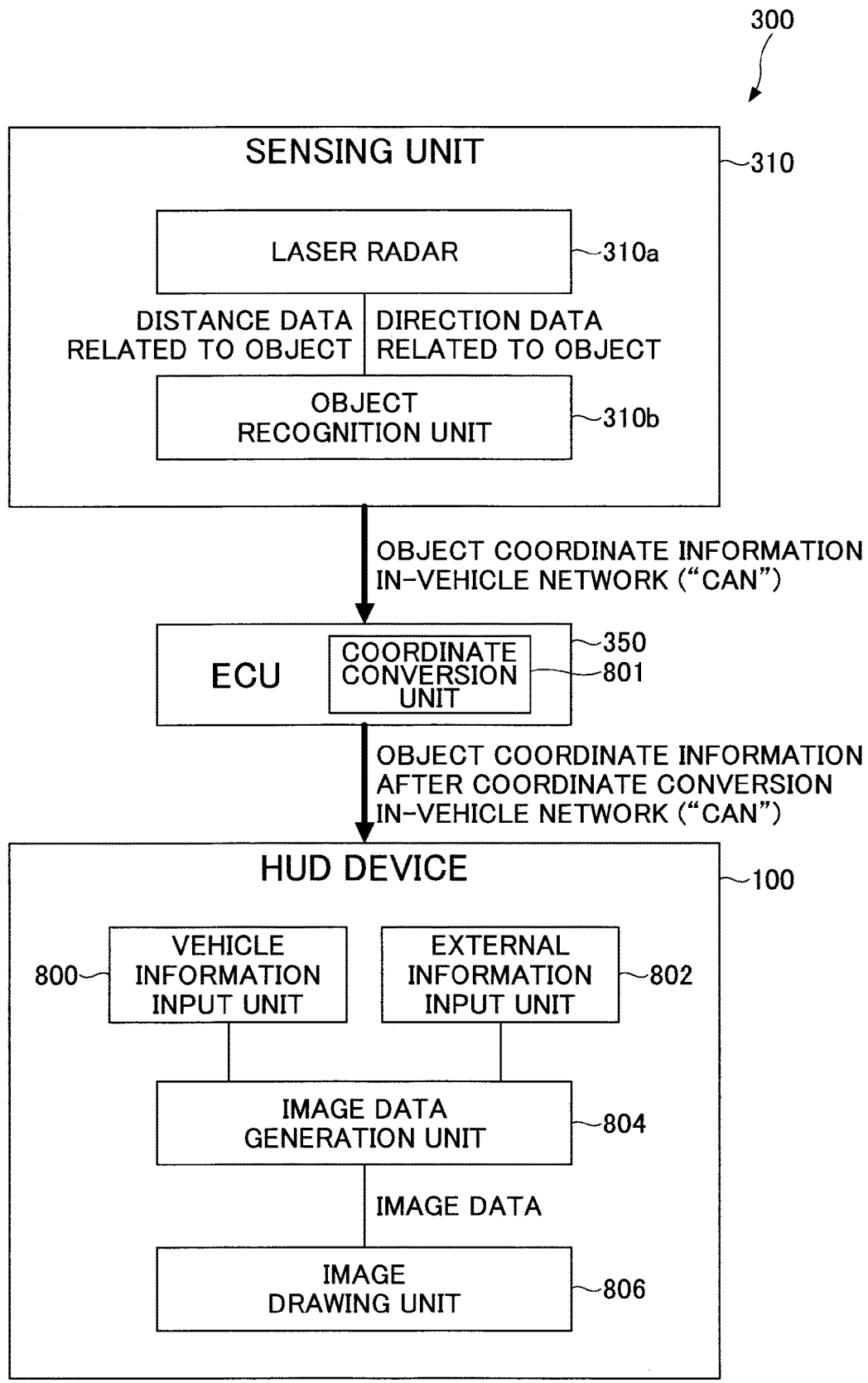

[Fig. 13]
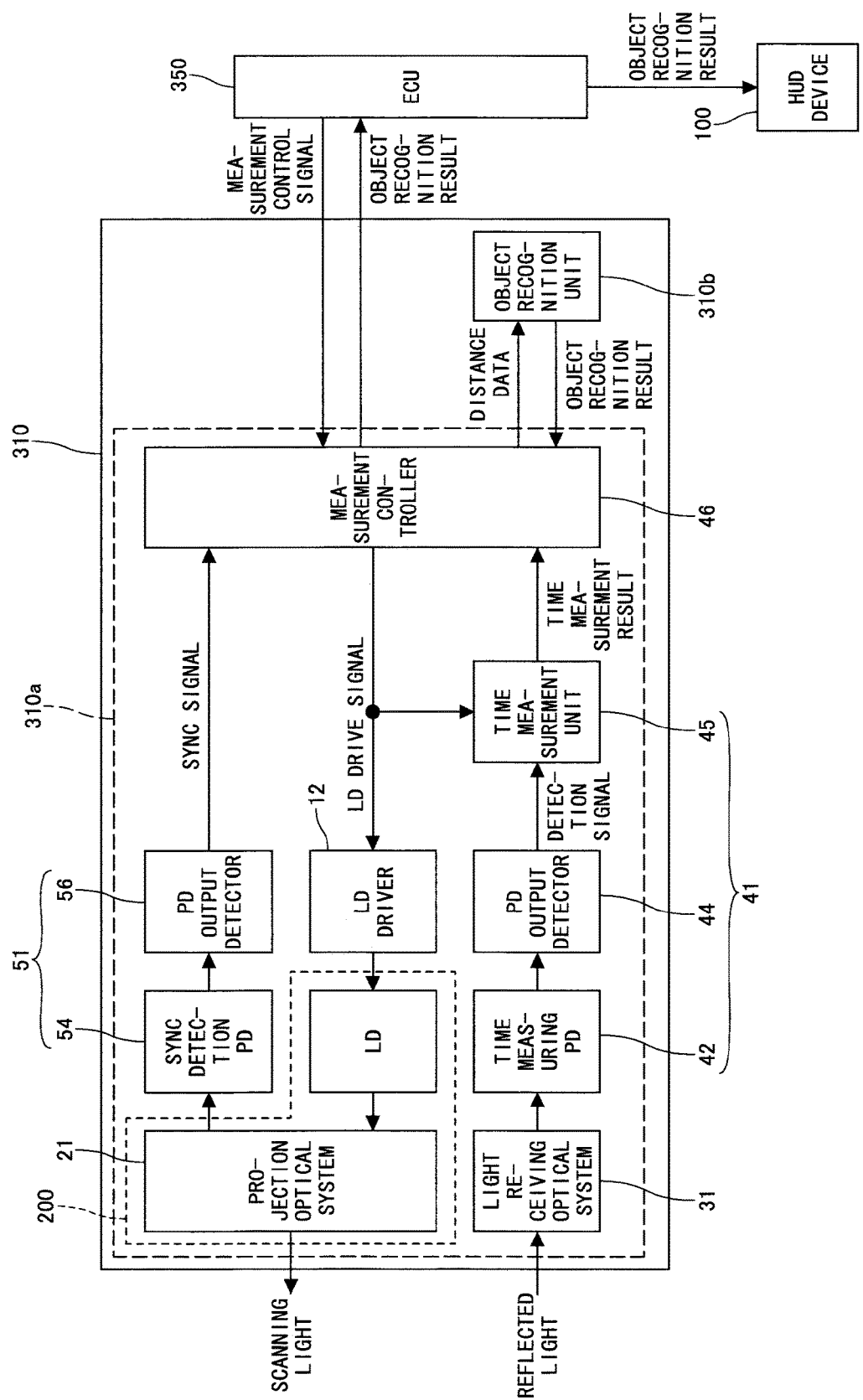

[Fig. 14A]
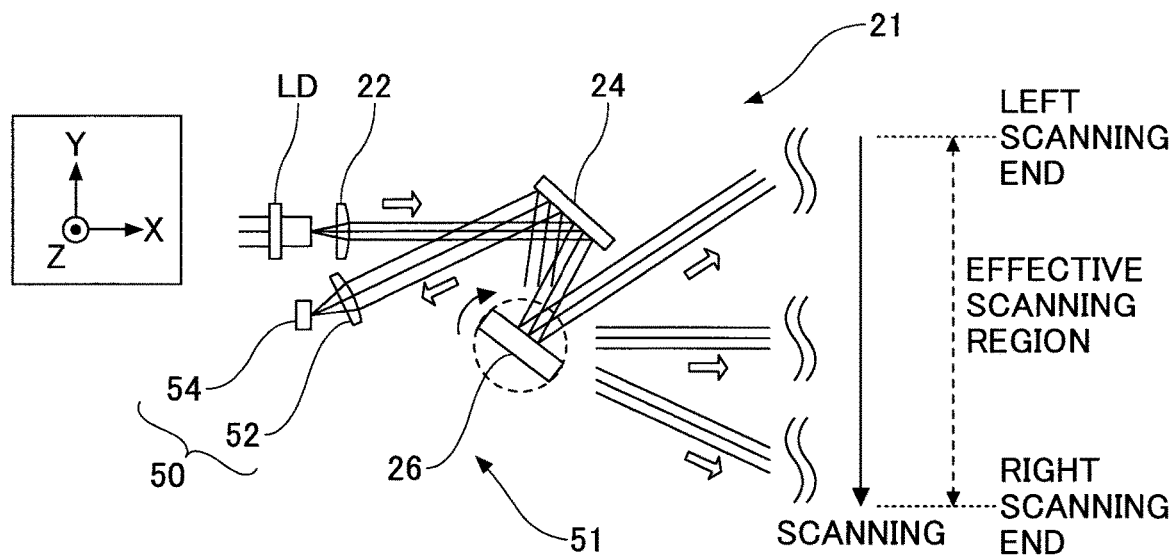
[Fig. 14B]
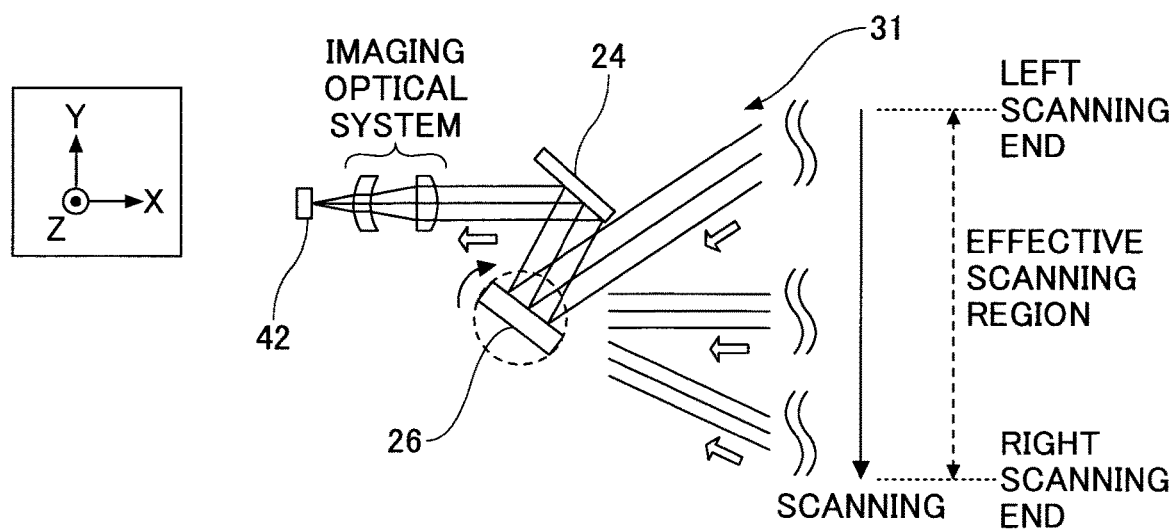

[Fig. 14C]
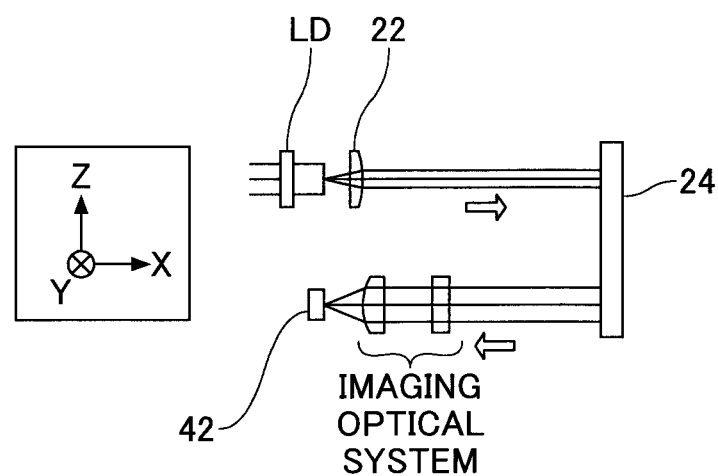

[Fig. 15]
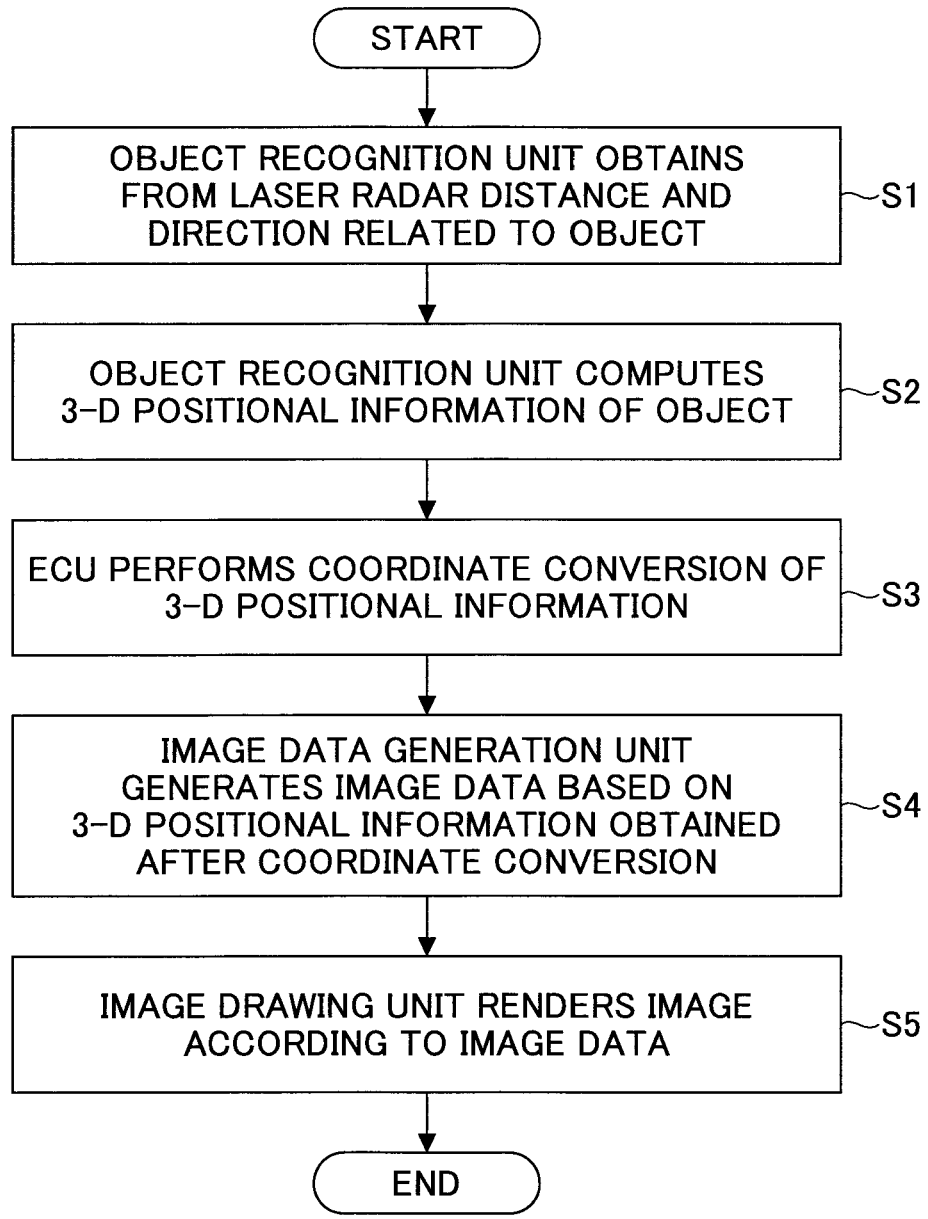

[Fig. 16]
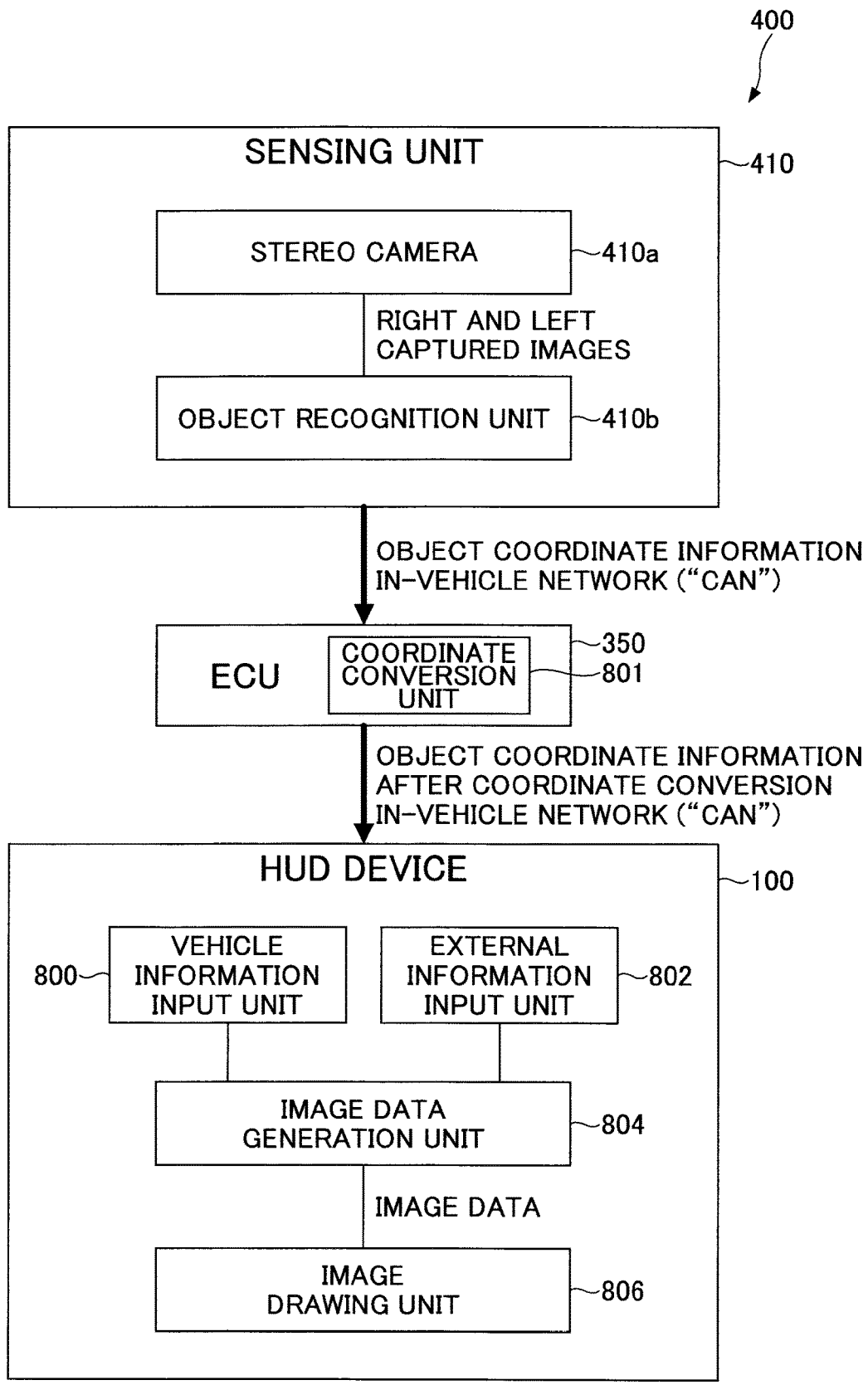

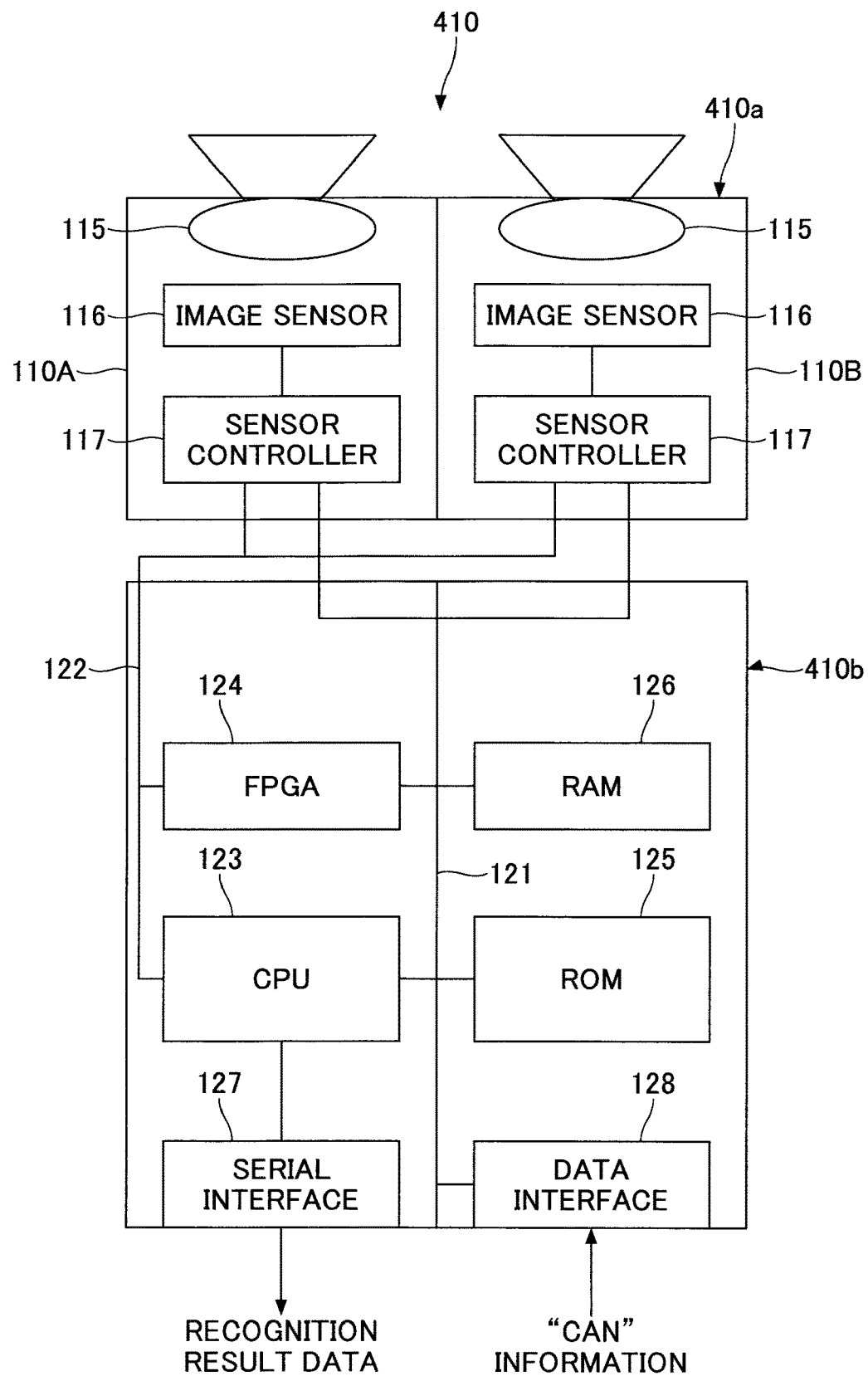
[Fig. 17]

[Fig. 18]
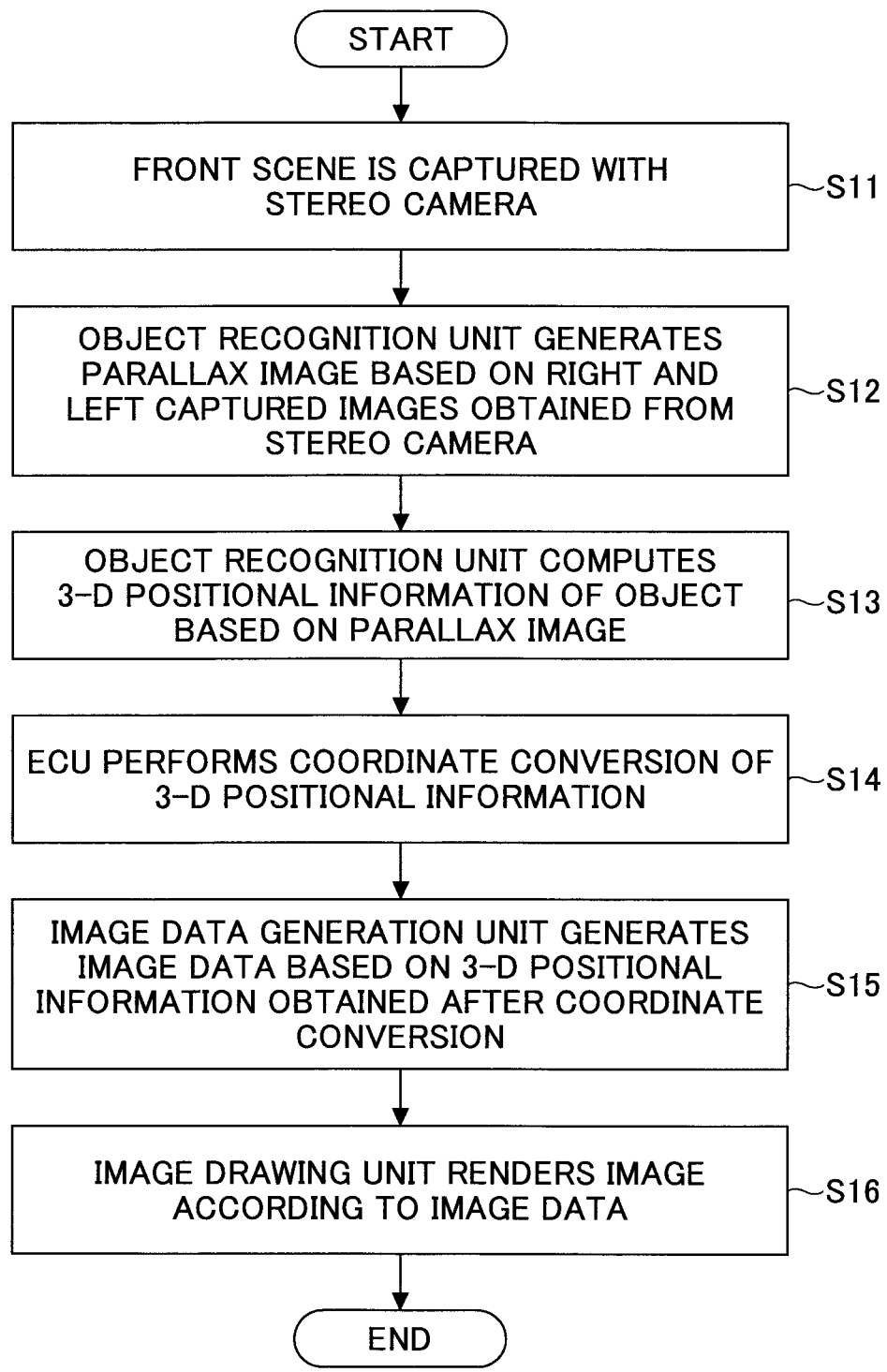

[Fig. 19]
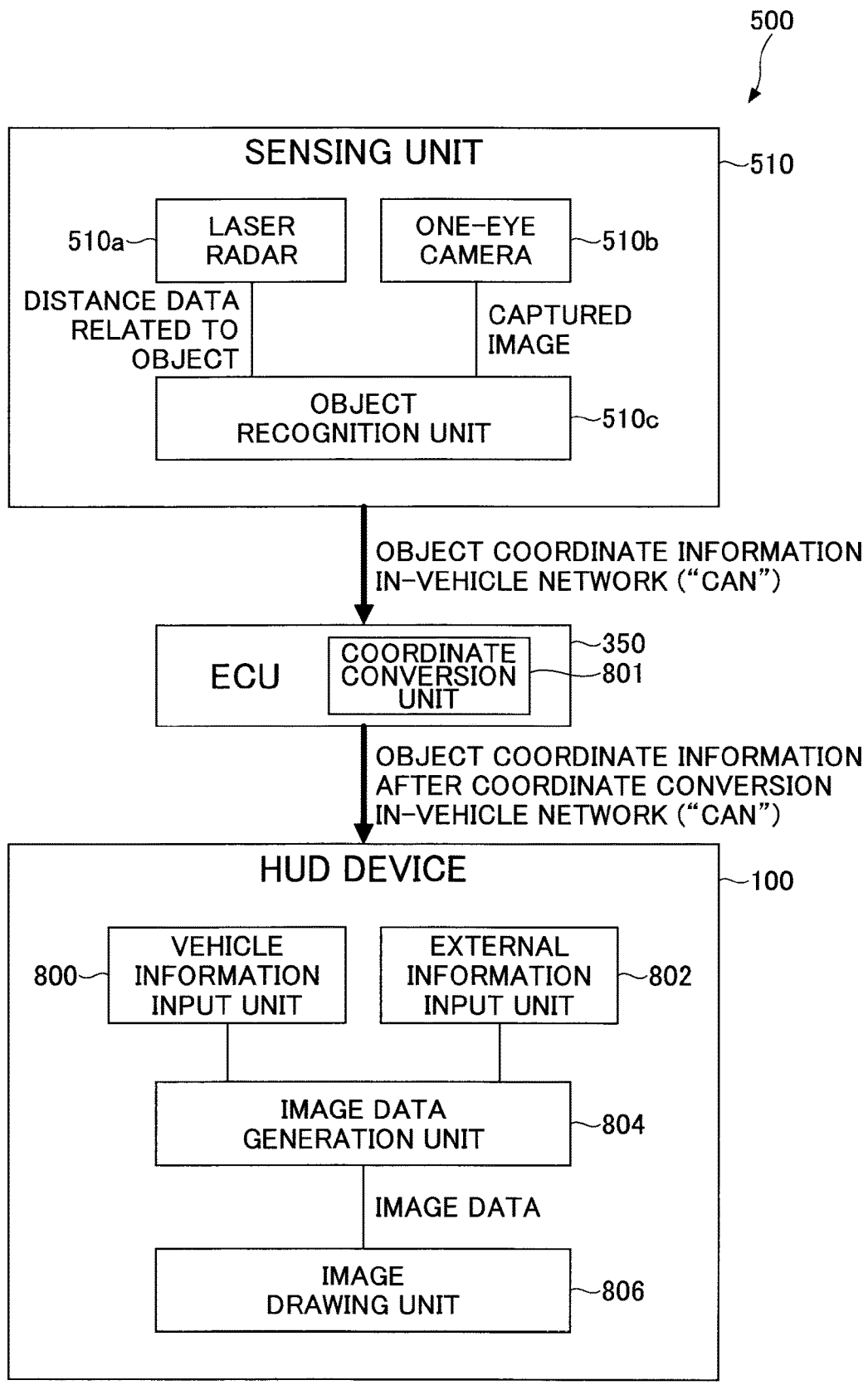

[Fig. 20]
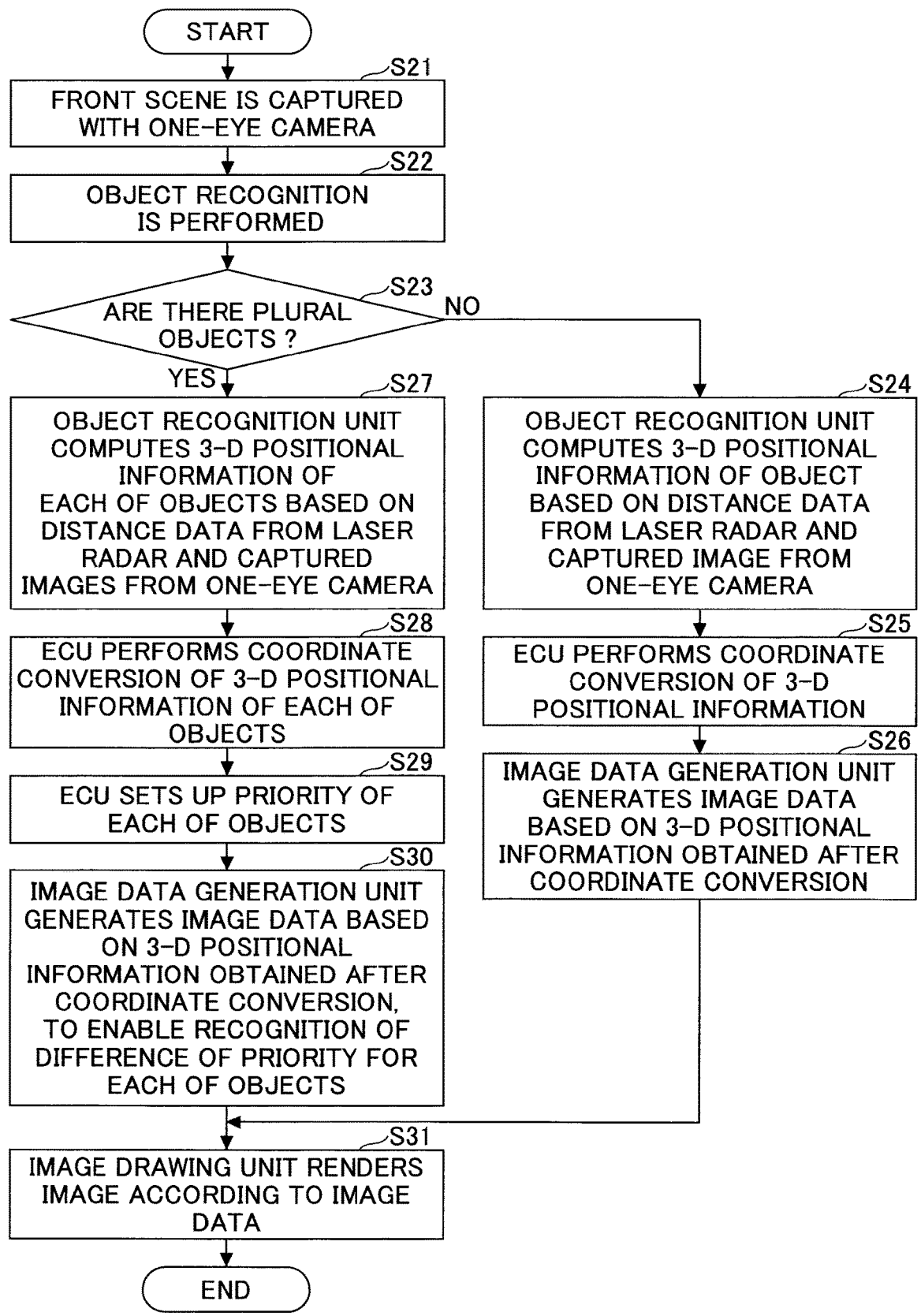

[Fig. 21]
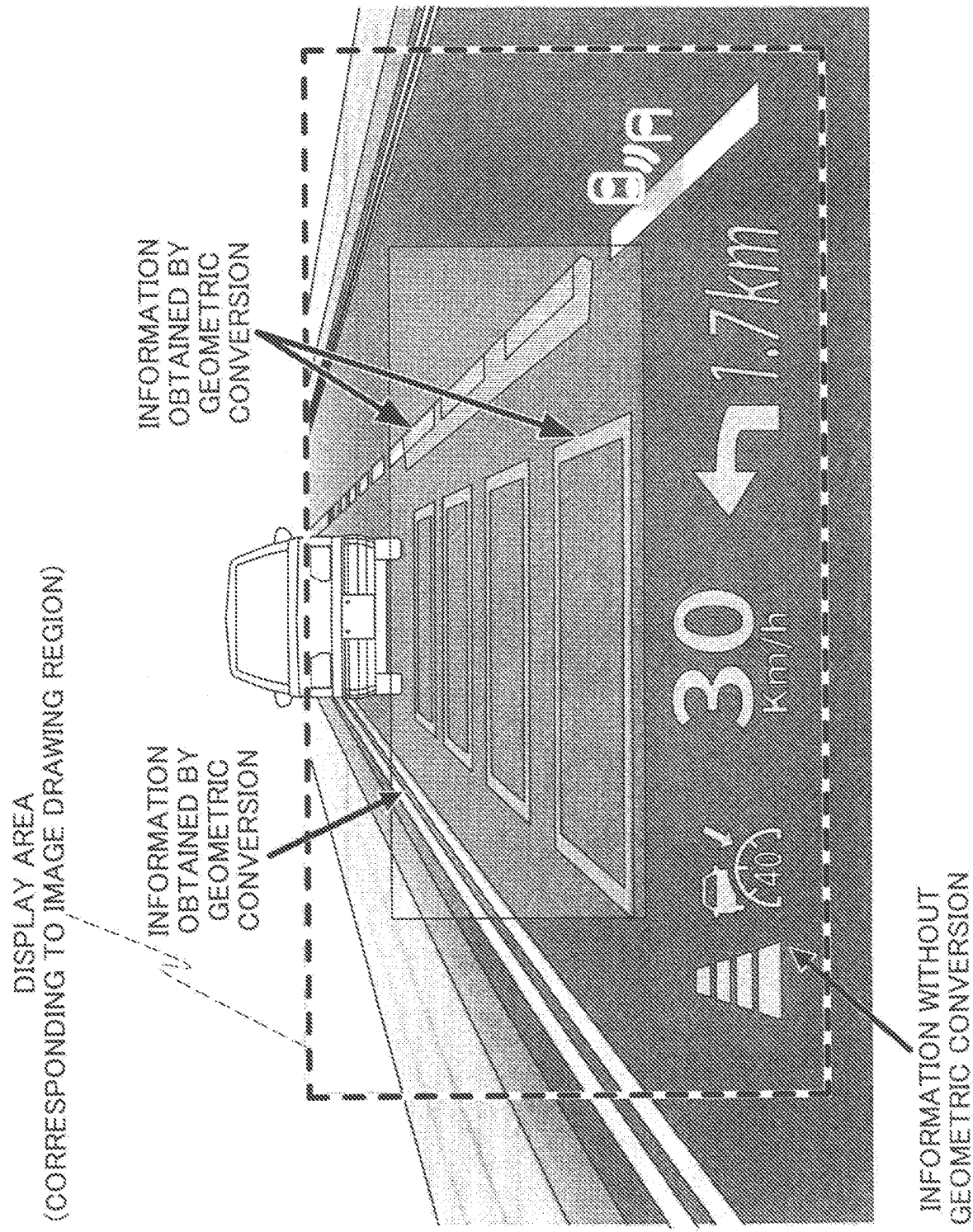

[Fig. 22]
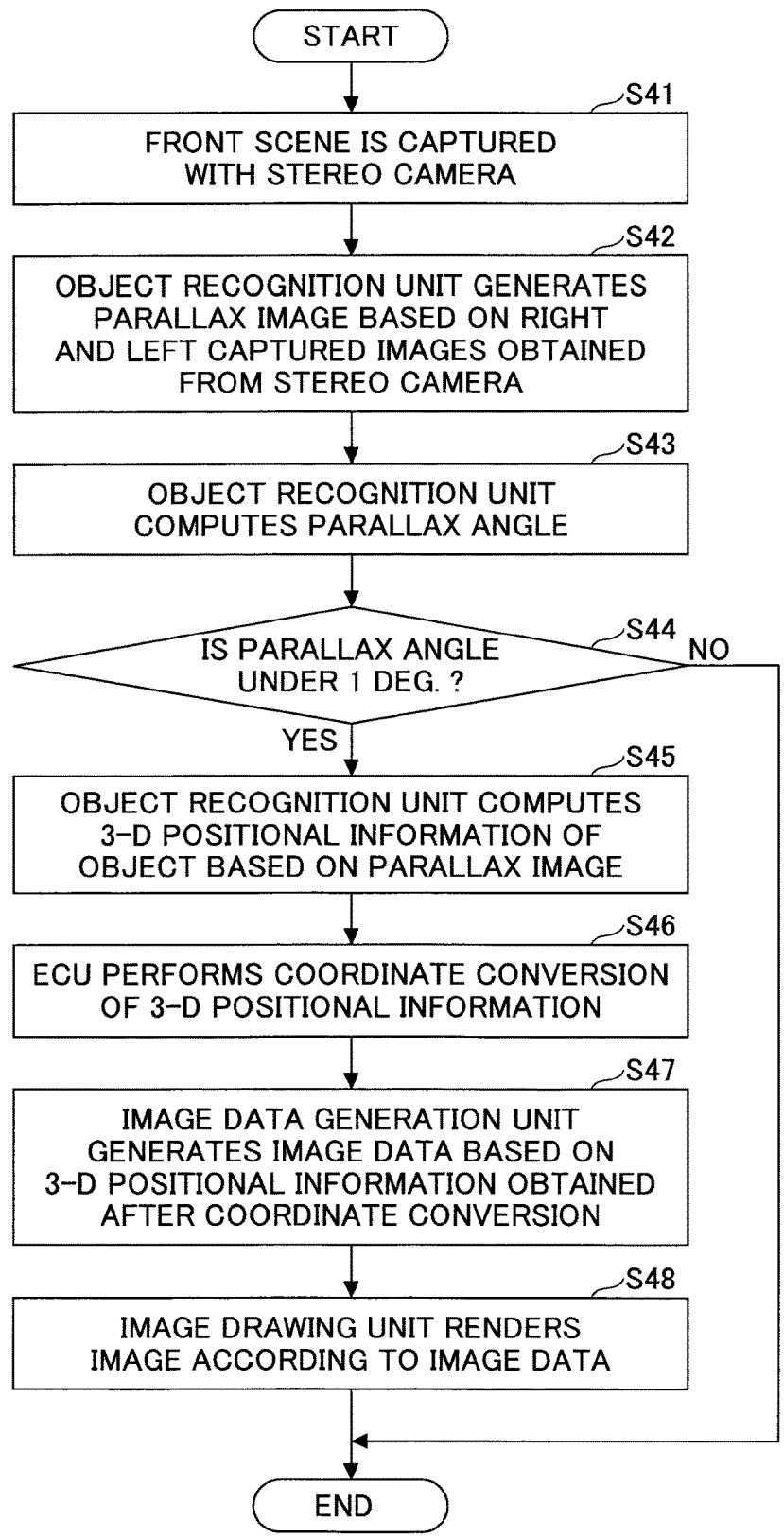

[Fig. 23]
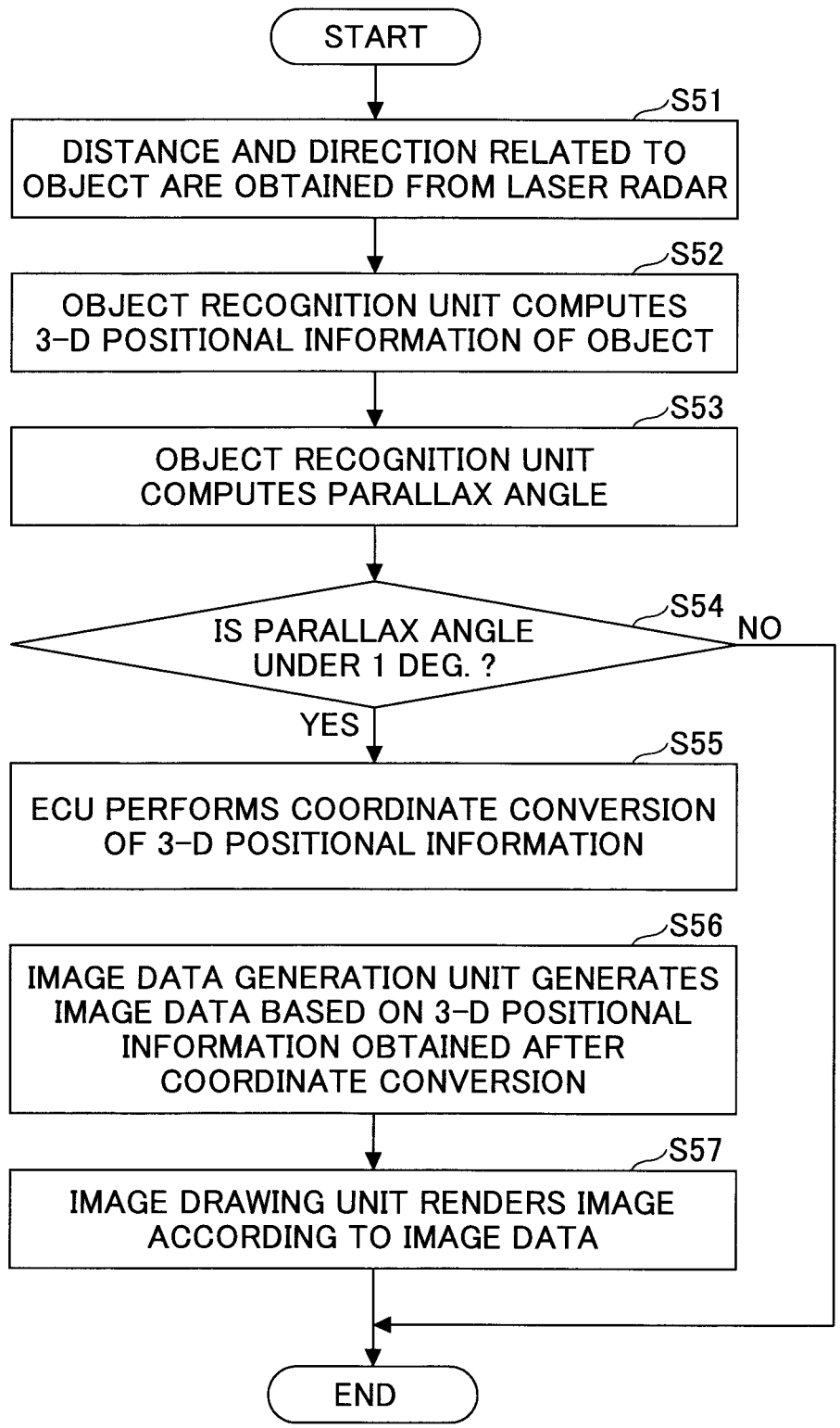

INFORMATION DISPLAY APPARATUS, INFORMATION PROVISION SYSTEM, MOVING OBJECT DEVICE, INFORMATION DISPLAY METHOD, AND RECORDING MEDIUM

TECHNICAL FIELD

The present disclosure relates to an information display apparatus, an information provision system, a moving object device, an information display method, and a recording medium.

BACKGROUND ART

In recent years, development of an apparatus that makes a virtual image visible has gained popularity. For example, PTL 1 listed below discloses an apparatus configured to project an image light beam only on one eye of an image viewer and make a virtual image visible.

CITATION LIST

Patent Literature

PTL 1: Japanese Unexamined Patent Application Publication No. 2010-076533

SUMMARY

Technical Problem

In one aspect, the present disclosure provides an information display apparatus which is capable of preventing the deterioration of the visibility of a virtual image and preventing the complexity of the device configuration.

Solution to Problem

In one embodiment, the present disclosure provides an information display apparatus which emits an image forming light beam to a transmissive reflection member and makes a virtual image visible through the reflection member, wherein the information display apparatus is configured to display the virtual image so that a difference between a convergence angle when viewing the virtual image through the reflection member and a convergence angle when viewing a real object through the reflection member is less than or equal to 1 degree.

Advantageous Effects of Invention

The information display apparatus according to one embodiment is capable of preventing the deterioration of the visibility of a virtual image and preventing the complexity of the device configuration.

The object and advantages of the invention will be realized and attained by means of the elements and combinations particularly pointed out in the claims. It is to be understood that both the foregoing general description and the following detailed description are exemplary and explanatory and are not restrictive of the invention as claimed.

BRIEF DESCRIPTION OF DRAWINGS

FIG. 1 is a diagram illustrating a configuration of a HUD device which is an information display apparatus according to a first embodiment.

FIG. 2 is a block diagram illustrating a hardware configuration of the HUD device.

FIG. 3 is a block diagram illustrating a functional configuration of the HUD device.

FIG. 4 is a diagram illustrating a configuration of a light source part.

FIG. 5 is a diagram illustrating a configuration of an optical deflector.

FIG. 6 is a diagram illustrating a trajectory of a scanning line at a time of two-dimensional scan.

FIG. 7 is a diagram for explaining a parallax angle.

FIG. 8 is a diagram for explaining a relationship between a background distance, a distance L from a viewpoint position to an imaging position of a virtual image, and a parallax angle.

FIG. 9 is a diagram illustrating an example of marking of a preceding vehicle existing in a front scene by a virtual image.

FIG. 10 is a diagram illustrating an example of displaying navigation information on a road surface behind a preceding vehicle.

FIG. 11 is a diagram illustrating an example of displaying speed information on a front road surface.

FIG. 12 is a block diagram illustrating a hardware and functional configuration of an information provision system of Example 3.

FIG. 13 is a block diagram illustrating a configuration of a sensing unit of the information provision system of Example 3.

FIG. 14A is a diagram illustrating a configuration of a laser radar of the sensing unit of Example 3.

FIG. 14B is a diagram illustrating a configuration of the laser radar of the sensing unit of Example 3.

FIG. 14C is a diagram illustrating a configuration of the laser radar of the sensing unit of Example 3.

FIG. 15 is a flowchart for explaining an information display method of Example 3.

FIG. 16 is a block diagram illustrating a hardware and functional configuration of an information provision system of Example 4.

FIG. 17 is a block diagram illustrating a hardware configuration of a sensing unit of Example 4.

FIG. 18 is a flowchart for explaining an information display method of Example 4.

FIG. 19 is a block diagram illustrating a hardware and functional configuration of an information provision system of Example 5.

FIG. 20 is a flowchart for explaining an information display method of Example 5.

FIG. 21 is a diagram for explaining the information display method of Example 5.

FIG. 22 is a flowchart for explaining an information display method according to a second embodiment.

FIG. 23 is a flowchart for explaining an information display method according to a modification of the second embodiment.

DESCRIPTION OF EMBODIMENTS

First Embodiment

A heads-up display (HUD) device 100 that is an information display apparatus according to a first embodiment will be described. FIG. 1 illustrates a configuration of the HUD device 100 according to the first embodiment.

Projection methods of HUD devices are usually classified into a panel method which forms an intermediate image by using an imaging device, such as a liquid crystal panel, a digital mirror device (DMD) panel or a vacuum fluorescent display (VFD); and a laser scan method which forms an intermediate image by scanning a laser beam emitted from a laser light source using a two-dimensional scanning device. Especially, the laser scan method can assign emission and non-emission for each of pixels and can form a high contrast image, unlike the panel method which forms an image by partial shading of full screen emission.

The laser scan method is used for the HUD device 100 according to the first embodiment. However, the panel method may be used instead as a projection method of the information display apparatus of the present disclosure.

As an example, the HUD device 100 is mounted on a moving object, such as a vehicle, an airplane, a marine vessel, or an industrial robot, and configured to make navigation information which is necessary for operation of the moving object (e.g., information including a speed of the moving object, a position or the presence of an object (real object) ahead of the moving object, a distance to the destination, a direction of movement, a present location name, an indicator such as a limiting speed, congestion information, etc.) visible through a front windshield 50 (see FIG. 1) of the moving object. In this case, the front windshield 50 functions also as a transmissive reflection member which is penetrated by a part of the incoming light and reflects at least a part of the remaining light. In the following, a case in which the HUD device 100 is mounted on a vehicle including the front windshield 50 will be described.

As illustrated in FIG. 1, the HUD device 100 includes an optical scanning unit 10, a screen 30, and a concave mirror 40. The HUD device 100 emits to a front windshield 50 a light beam (image light beam) for forming an image on the front windshield 50, and enables visual confirmation of a virtual image I from a viewpoint position (a midpoint of both eyes of a viewer) of an image viewer A (which is, in this embodiment, a driver who is an occupant of the vehicle).

Namely, the image viewer is able to view an image (intermediate image) formed (or rendered) on the screen 30 by the optical scanning unit 10 (drawing) as the virtual image I through the front windshield 50. This intermediate image is an information provision image for providing information to the driver.

As an example, the HUD device 100 is disposed under a dashboard of the vehicle, and a distance from the viewpoint position of the image viewer A to the front windshield 50 is in a range from several tens of centimeters to one meter at most.

In the present embodiment, the concave mirror 40 is designed by using the existing optical design simulation software to have a predetermined converging power to enable the imaging position of the virtual image I to be consistent with a desired position. Moreover, in the present embodiment, a concave mirror is used as a scanning mirror 20. However, a convex mirror or a plane mirror may be used as the scanning mirror 20 instead of the concave mirror.

In the present embodiment, the converging power of the concave mirror 40 is set up so that the virtual image I is displayed at a position (depth position) which is greater than or equal to 4 m and less than or equal to 10 m (preferably, less than or equal to 6 m) distant from the viewpoint position of the image viewer A.

Note that the front windshield is usually formed into not a flat surface but a slightly curved surface, and thus the imaging position of the virtual image I is determined by the curved surfaces of the concave mirror 40 and the front windshield 50.

The optical scanning unit 10 includes a light source unit 11, an optical deflector 15, and the scanning mirror 20. A light beam from the light source unit 11 is deflected by the optical deflector 15, and the deflected light beam is reflected back by the scanning mirror 20 to perform optical scanning of the screen 30. It is preferable that at least one of the concave mirror 40 and the scanning mirror 20 is designed and arranged to correct the optical distortion element turning a horizontal line of the intermediate image into an upward or downward convex line due to the influence of the front windshield 50.

In the light source unit 11, laser beams of 3 colors of R, G, B are combined. The combined light beam in which the laser beams of the 3 colors are combined is led to a reflection surface of the optical deflector 15. The optical deflector 15 is formed of a Micro Electro Mechanical Systems (MEMS) scanner produced by a semiconductor manufacturing process, and the MEMS scanner includes a single micro mirror which is swingable perpendicularly around each of two orthogonal axes. Note that the optical deflector 15 may be formed by combining two MEMS scanners each including a micro mirror swingable around one axis. Alternatively, a galvano scanner or a polygon scanner may be used as the scanner included in the optical deflector instead of the MEMS scanner. A detailed configuration of the light source unit 11 will be described later.

A bundle of light beams deflected by the optical deflector 15 is reflected back by the scanning mirror 20, and a one-dimensional or two-dimensional image (intermediate image) is rendered on the surface (scanned surface) of the screen 30. It is preferable that a micro lens array or a micro mirror array having a function of making the laser beam bundle diverge with a desired divergence angle is used as the screen 30. Alternatively, a diffusion plate to diffuse the laser beam bundle, or a transparent plate or a reflection plate having a smooth surface may be used instead. A detailed configuration of the optical deflector 15 will be described later.

The laser beam bundle from the screen 30 is reflected by the concave mirror 40, and the reflected laser beam bundle is incident on the front windshield 50. Part of the incoming bundle to the front windshield 50 is passed through the front windshield 50, and at least part of the remaining laser beam bundle is reflected toward the viewpoint position. As a result, the image viewer is able to view the virtual image I, created by enlarging the intermediate image, through the front windshield 50. Namely, the image viewer is able to view an enlarged display of the virtual image I through the front windshield 50.

Note that a combiner as the transmissive reflection member may be disposed at a position nearer to the viewpoint position than the front windshield 50, and the laser beam bundle from the concave mirror 40 may be led to the combiner so that the image display is performed in a manner similar to the case in which the front windshield 50 is solely disposed.

FIG. 2 illustrates a hardware configuration of a control system of the HUD device 100. As illustrated in FIG. 2, the control system of the HUD device 100 includes a field-programmable gate array (FPGA) 600, a central processing unit (CPU) 602, a read-only memory (ROM) 604, an interface 608, a bus line 610, a laser diode (LD) driver 6111, and a MEMS controller 615.

The FPGA 600 is configured to control the LD driver 6111 to operate an LD 111 (which will be described later), and configured to control the MEMS controller 615 to operate the optical deflector 15. The CPU 602 is configured to control overall operations of the HUD device 100. The ROM 604 is configured to store an image processing program for controlling the overall operations of the HUD device 100. The RAM 606 is utilized as a work area of the CPU 602. The interface 608 is configured to allow the HUD device 100 to communicate with an external controller. For example, the interface 608 is connected to a controller area network (CAN) of the vehicle.

FIG. 3 illustrates a functional configuration of the HUD device 100. As illustrated in FIG. 3, the HUD device 100 includes a vehicle information input unit 800, an external information input unit 802, an image data generation unit 804, and an image drawing unit 806.

The vehicle information input unit 800 is configured to receive vehicle information (which is information including a vehicle speed, a mileage, a distance to a target object, a brightness of an external environment, etc.) from the CAN. The external information input unit 802 is configured to receive information regarding the exterior of the vehicle (which is navigation information from a GPS, etc.) from an external network. The image data generation unit 804 is configured to generate image data of an image to be rendered, based on the vehicle information received by the vehicle information input unit 800 and the information received by the external information input unit 802. The image drawing unit 806 includes a control unit 8060. The control unit 8060 is configured to control the optical scanning unit 10 according to the image data, and thereby the image drawing unit 806 is configured to emit the image light beam to the front windshield 50. As a result, the virtual image I is made visible from the viewpoint position of the image viewer A.

The above units illustrated in FIG. 3 represent functions and units implemented by any of the elements and devices of the HUD device 100 illustrated in FIG. 2, which are activated by instructions from the CPU 602 based on the program stored in the ROM 604.

FIG. 4 illustrates a detailed configuration of the light source unit 11. As illustrated in FIG. 4, the light source unit 11 includes a plurality of light emitting devices 111R, 111B, and 111G each having one or more emission points. As an example, each of the light emitting devices 111R, 111B, and 111G is formed of an LD (laser diode). The light emitting devices 111R, 111B, and 111G emit laser beams with mutually different wavelengths $\lambda R$, $\lambda G$, and $\lambda B$, respectively. For example, $\lambda R$=640 nm, $\lambda G$=530 nm, $\lambda B$=445 nm. The bundle of laser beams with the wavelengths $\lambda R$, $\lambda G$, and $\lambda B$, emitted from the LD 111R, the LD 111G, and the LD 111B, is coupled to a following optical system by corresponding coupling lenses 112R, 112G, and 112B, respectively. The bundle of laser beams coupled is shaped by corresponding aperture members 113R, 113G, and 113B. An aperture shape of each of the aperture members 113R, 113G, and 113B may be set to any of various shapes, including a circle, an ellipse, a rectangle, and a square, according to the divergence angle of the laser beam bundle. Subsequently, the optical paths of the laser beams of the bundle shaped by the aperture members are coupled together by a combining element 120. The combining element 120 may be a plate-shaped or prism-shaped dichroic mirror which reflects and penetrates the laser beams of the bundle according to the wavelength thereof and couples the laser beams to a single optical path. The coupled laser beam bundle is led to the reflection surface of the optical deflector 15 by a lens 119. The lens 119 may be a meniscus lens having a concave surface facing the optical deflector 15.

FIG. 5 illustrates a detailed configuration of the optical deflector 15. The optical deflector 15 is a MEMS scanner produced by a semiconductor manufacturing process. As illustrated in FIG. 5, the optical deflector 15 includes a mirror 150 having a reflection surface, and a pair of meandering parts 152 disposed apart from each other. Each of the meandering parts 152 includes a plurality of beams arrayed in an X-axis direction so that two adjacent beams are connected by a fold-back portion in a zigzag fashion. The two adjacent beams included in each of the meandering units 152 include a beam-A 152a and a beam-B 152b, which are supported by a frame member 154. A plurality of piezoelectric elements 156 (for example, PZT) are individually provided in the plurality of beams. By applying different voltages to the piezoelectric elements of the two adjacent beams included in each of the meandering units, the two adjacent beams are deflected in different directions, and such deflections of the two adjacent beams are accumulated, so that the mirror 150 is rotated by a comparatively great angle around the X-axis (=vertical direction).

By such configuration, the vertical direction optical scanning around the X-axis is implemented with low voltage. On the other hand, the horizontal-direction optical scanning around the Y-axis is implemented by the resonance using a torsion bar spring connected to the mirror 150.

By controlling the above-described optical deflector 15, the laser beam is scanned at two dimensional positions (e.g., raster scan) in an image drawing region of the screen 30 (see FIG. 6), and image rendering on a pixel-by-pixel basis and display of a virtual image may be implemented by performing emission control of the LD according to the scanning position of the laser beam. In FIG. 6, "Ps" denotes a scanning line pitch.

Although only a point image which is equivalent to the diameter of the laser beam is projected momentarily from the HUD device 100, the laser beam is scanned at a very high speed and the afterimage fully remains in the human eyes within a one-frame image. By utilizing the residual image phenomenon, it is possible to make the driver perceive the image projected on the display area. Actually, the image formed on the screen 30 is reflected by the concave mirror 40 and the front windshield 50, and the reflected image is perceived by the driver as the virtual image in the display area. Hence, when the image is not displayed, the emission of the laser beam by the LD is stopped. It is possible to set the brightness of portions other than the portion where the virtual image is displayed in the display area, to zero.

Namely, the imaging position of the virtual image formed by the HUD device 100 may be set to an arbitrary position in a predetermined display area where the virtual image can be formed. The predetermined display area may be set up by the specifications at the design phase of the HUD device 100.

By utilizing the laser scan method, it is possible to take measures of turning off the LD or reducing the light quantity for the portions other than the portion where the virtual image is displayed.

On the other hand, when the panel method is utilized for an intermediate image, an imaging device such as a liquid crystal panel or a DMD panel, illuminating the entire panel is required, and it is difficult to set the brightness of portions other than the portion where the virtual image is displayed in the display area, to zero when the image is not displayed.

Right and left eyes of a human exist at different positions. Parallax is a displacement in the apparent position of an object viewed along two lines of sight of both eyes of a viewer, and is measured by the angle of inclination between the lines of sight of the respective eyes of the viewer. Due to foreshortening, nearby objects have a larger parallax than more distant objects when observed from different positions, so parallax can be used to determine distances. Human brain perceives depth by recognizing the difference between projections of an object reflected in the eyes of the viewer.

A HUD device is, for example, an in-vehicle display device which displays information as a virtual image ahead of a driver of a vehicle. Such a virtual image is superimposed and displayed in the front scene viewed by the driver. By adjusting geometrical configuration of display information in the virtual image to match with real space, it is possible to make the driver perceive the display information as apparently existing at an arbitrary position in the real space.

However, the display image (virtual image) of the HUD device is projected at two-dimensional positions which are determined at the design phase. Even if the shape and the tone are adjusted so that the display image is viewed as existing at an arbitrary position in real space (for example, on the road surface to which the viewpoint of the driver is directed), parallax, or the difference of the projection according to the position where the virtual image is displayed, will arise in the retinas of both eyes of the driver.

As illustrated in FIG. 7, $\theta_{HUD}$ denotes an angle of inclination (convergence angle) between lines of sight of both eyes of a driver (image viewer) when viewing a virtual image of the HUD device 100, which represents a parallax in this case, and $\theta_{scene}$ denotes an angle of inclination (convergence angle) between lines of sight of the respective eyes of the driver when the driver observes a far point in a front scene, which represents a parallax in that case. In the following, $|\theta_{HUD}-\theta_{scene}|$ is referred as a parallax angle. Note that the angle of inclination between lines of sight of both eyes of an image viewer when viewing an object is generally called a convergence angle.

It is commonly known that if the parallax angle exceeds 1 degree, the viewer may perceive a double image, a feeling of fatigue, and displeasure. To eliminate the problem, the HUD device 100 according to the first embodiment is designed so that the parallax angle is less than or equal to 1 degree. It is confirmed that when the distance L from the viewpoint position to the imaging position of the virtual image I is equal to 4 m, the distance between the viewpoint position and the object is greater than or equal to 2 m and less than or equal to 1000 m and the parallax angle is less than or equal to 1 degree. It is further confirmed that when the distance L from the viewpoint position to the imaging position of the virtual image I is greater than or equal to 6 m, the parallax angle is less than 1 degree even if the object lies at an infinite distance. The shorter the distance L, the shorter the optical path distance in the device, and it is possible to attain the miniaturization of the HUD device.

In consideration of the fact that the HUD device 100 according to the first embodiment is utilized as the information display apparatus mounted on the vehicle, if the distance L is set to be in a range from 4 m to 6 m, the HUD device 100 is applicable to at least an object at a distance of 1000 m ahead of the vehicle, which appears adequate for practical applications and advantageous also to miniaturization of the HUD device.

If the HUD device 100 is applicable to an object at a distance of 2 m or greater from the viewpoint position, it appears adequate for practical applications. Namely, the necessity of marking an object in the vicinity of less than 2 m from the viewpoint position m with a virtual image is very low. From a functional standpoint, if the HUD device 100 is applicable to an object at a distance of y m (=2 m to 5 m) or greater from the viewpoint position, it appears satisfactory.

In a case where the HUD device 100 is mounted on an airplane, if the distance L is set to be in a range from 4 m to 6 m (preferably, from 5 m to 6 m), the HUD device 100 is applicable to an object existing far away and miniaturization of the HUD device may be attained.

Even when the HUD device 100 is mounted on any kind of a moving object, the distance L may be set to be 6 m or greater. However, from a standpoint of preventing enlargement of the HUD device, it is preferable that the distance L is set to 10 m or less.

The HUD device 100 is configured so that the imaging position (at least the depth position) of a virtual image by the optical scanning unit 10 and the concave minor 40 is set up to make the parallax angle less than or equal to 1 degree. For example, the imaging position of a virtual image may be set up by the curvature (power) of each of the scanning minor 20, the concave mirror 40, and the transmissive reflection member (e.g., the front windshield 50).

FIG. 8 is a diagram for explaining a relationship between a background distance, a distance L from a viewpoint position to an imaging position of a virtual image I, and a parallax angle computed from the distance L. As is apparent from FIG. 8, in order to recognize the virtual image without generating a double image or a parallax, in addition to an arbitrary gazing point in a front scene, it is necessary that the display distance of the virtual image (the distance from the viewpoint position to the imaging position of the virtual image) by the HUD device 100 is 4 m or greater.

In the HUD device 100 according to the first embodiment, when a virtual image is generated at a position nearer than a target object, the parallax angle between the target object and the virtual image superimposed and displayed in the vicinity of the target object is less than or equal to 1 degree, and it is possible to recognize the information by the virtual image clearly while viewing the target object existing in the front scene. However, it is confirmed that when portions of the display area other than the virtual image are darkened and the areas where the information is not displayed are slightly highlighted, the effect of making the virtual image visible in the vicinity of the target object will be suppressed. By utilizing the laser scan method in the HUD device 100 according to the first embodiment, it is possible to maintain a feeling of extended reality without suppressing the advantageous effect of the present disclosure.

Next, some examples of the first embodiment will be described.

Example 1

As illustrated in FIG. 9, in Example 1, in order to mark a preceding vehicle 100 m ahead of a vehicle with a virtual image, the HUD device 100 is utilized to display in a field of view of a driver (image viewer) a two-dimensional virtual image as a mark which appears at a distance of 100 m ahead of the vehicle.

In the field of view, the preceding vehicle at a distance of 100 m ahead and the road surface behind the preceding vehicle are included. The preceding vehicle at a distance of 100 m ahead is viewed as existing at a distant place from the driver, and the road surface behind the preceding vehicle is viewed as existing at a near place to the driver. In this example, the virtual image is a U-shaped mark, and this virtual image is superimposed and displayed on the road surface behind the preceding vehicle.

It is preferable that the parameters of a shape, a size, a brightness, a color, and a position of this mark match with the parameters of a shape, a size, a brightness, a color, and a position of the preceding vehicle 100 m ahead. It is preferable to change the parameters according to the vehicle to vehicle distance between the preceding vehicle and the vehicle. By making the parameters in conformity, it looks as if the mark exists in the vicinity of the position of the preceding vehicle 100 m ahead of the vehicle.

However, the position where the virtual image (mark) exists (is displayed) is at a distance of x m when viewed from the image viewer. If the parallax angle between the preceding vehicle and the virtual image exceeds 1 degree at this time, the virtual image may be viewed as a double image. If such a virtual image is displayed in the field of view, it is difficult for the image viewer to recognize the virtual image. The image viewer may perceive a feeling of fatigue and displeasure.

If the projected distance of the virtual image (mark) (or the distance L from the viewpoint position of the image viewer to the imaging position of the virtual image) is set to 6 m, $\theta_{HUD}$ is equal to 0.62 deg. The target object on the background side of the virtual image exists on the road surface behind the preceding vehicle. If the distance of the target object to the road surface is set to 99 m, $\theta_{scene}$ is equal to 0.037 deg. In this case, the parallax angle $|\theta_{HUD}-\theta_{scene}|$ is less than 1 degree, and a double image or parallax does not arise. Note that the computation of the parallax angle in this case is performed based on the assumption that a distance between both eyes of an image viewer is equal to 65 mm (this value indicates an average of Japanese people).

As described above, by utilizing the HUD device 100 of Example 1 which is configured so that the parallax angle is set to be less than or equal to 1 degree, it is possible to suppress the occurrence of a double image, displeasure and a feeling of fatigue, and a virtual image displayed in a field of view and a preceding vehicle included in the field of view are recognized as existing at the same position.

Example 2

As illustrated in FIG. 10, in Example 2, the HUD device 100 is utilized to display a virtual image obtained by geometric conversion so that the virtual image has a depth position from a road surface included in a field of view when viewed from an image viewer. Moreover, a virtual image without geometric conversion (e.g., navigation information including a vehicle speed) is also displayed. The image data generation unit 804 generates image data by performing geometric conversion of the original image data, and the image drawing unit 806 renders the virtual image based on the image data obtained by the geometric conversion.

In Example 2, a part of the road surface on which the virtual image is superimposed is included in the field of view. Specifically, the virtual image obtained by geometric conversion and displayed is an arrow pattern to prompt the driver to perform a lane change indicated by the navigation information, an upper end of the arrow pattern is viewed as a distant portion from the viewpoint of the driver, and a lower end of the arrow pattern is viewed as a near portion from the viewpoint of the driver.

An object included in the field of view is viewed to have a depth position (a distant place or a near place) from the viewpoint position. However, the virtual image produced by the HUD device 100 is a two-dimensional image having no depth position when viewed from the viewpoint position.

When both eyes of the driver are focused on a front scene (distant place) and the parallax angle between the front scene and the virtual image exceeds 1 degree, it is difficult to recognize the displayed virtual image as the navigation information while viewing the front scene. The driver may perceive the virtual image as a double image. In order to recognize the information of the virtual image when the virtual image is displayed in the field of view, it is necessary for the image viewer to move the viewpoint to the virtual image.

In this case, the HUD device 100 is configured so that the parallax angle is less than or equal to 1 degree, and it is possible to correctly recognize the navigation information while viewing the front scene.

In the above example, the case where the preceding vehicle is marked with the virtual image, and the case where the virtual image is superimposed on the road surface have been described. Further, it may be assumed that arbitrary objects in the front scene ahead of the driver, including a pedestrian, a white line on a road surface, and a building, are marked with virtual images, and the virtual images are superimposed on such objects.

Next, an information display method for displaying an image by the HUD device 100 will be described. In the image display by the HUD device 100, an image to be displayed is determined based on a driver's viewpoint position, a virtual image position, a distance between a viewpoint and a virtual image, a size of a virtual image, and a range in which superposition of a virtual image is performed.

When a virtual image is superimposed on a road surface, it is preferable that a target position and a target distance are determined and the display of the virtual image obtained by geometric conversion is performed so that the displayed virtual image is viewed as existing in the target position at the target distance when viewed from a driver's viewpoint (see FIG. 11).

When a virtual image is displayed by assuming that a road surface is a flat surface, the image display can be performed only by performing geometric conversion. However, when a road surface shape such as a curve or a slope is displayed, or when a virtual image superimposed on a white line is displayed, it is necessary to obtain the coordinates (position information) of the target position for superimposing the virtual image on the road surface. Moreover, when a virtual image is superimposed on an object such as a preceding vehicle or a pedestrian, it is necessary to obtain the position information of the object.

Example 3

FIG. 12 illustrates a hardware and functional configuration of an information provision system 300 of Example 3 which is appropriate for the case where the position information of the object is required.

As illustrated in FIG. 12, the information provision system 300 which is mounted on a moving object (e.g., a vehicle) includes the HUD device 100, a sensing unit 310 (three-dimensional position information acquisition unit), and a coordinate conversion unit 801. The sensing unit 310 is configured to obtain the three-dimensional position information of an object included in the field of view. The coordinate conversion unit 801 is configured to convert the three-dimensional position information of the object obtained by the sensing unit 310 and based on the coordinate system of the sensing unit 310 into the coordinates based on the coordinate system (see FIG. 6) of the HUD device 100.

In this example, the coordinate conversion unit 801 is provided in an electronic control unit (ECU) 350 of the vehicle. However, the coordinate conversion unit 801 may be provided separately from the ECU 350.

The sensing unit 310 includes a laser radar 310a and an object recognition unit 310b (three-dimensional position information computation unit). The laser radar may be called LIDAR (Laser Imaging Detection and Ranging).

Next, the sensing unit 310 will be described with reference to FIGS. 12 to 14C. FIG. 13 illustrates a configuration of the sensing unit 310 and FIGS. 14A to 14C illustrate configurations of the laser radar 310a.

As illustrated in FIG. 13, the laser radar 310a is a scanning type laser radar mounted on a vehicle. The laser radar 310a is configured to emit a laser beam and receive a reflection laser beam (scattered light) from an object (a preceding vehicle, a stopped vehicle, a structure, a pedestrian, etc.) so that a distance to the object is measured. As an example, electric power from a battery (storage battery) of the vehicle is supplied to the laser radar 310a.

As illustrated in FIG. 13, the laser radar 310a includes a laser diode (LD) as a light source, an LD driver 12, a projection optical system 21, a light receiving optical system 31, a detection system 41, a sync system 51, and a measurement control unit 46.

As an example, the LD is formed of an edge emitting laser. The LD is driven by the LD driver 12 to emit a laser beam. The LD driver 12 turns on the LD to emit a laser beam (emission) based on an LD drive signal (rectangular pulsed signal) output from the measurement control unit 46. As an example, the LD driver 12 includes a capacitor connected to the LD to supply current to the LD, a transistor for switching on and off the conduction between the capacitor and the LD, and a charge unit for charging the capacitor. The measurement control unit 46 is configured to start and stop measurement in response to receiving a measurement control signal (a measurement start signal or a measurement danger signal) from the ECU of the vehicle.

FIG. 14A schematically illustrates a configuration of the projection optical system 21 and the sync system 51. FIG. 14B schematically illustrates a configuration of the light receiving optical system 31. In the following, an XYZ three-dimensional rectangular coordinate system in which a Z-axis direction indicated in FIG. 14A is assumed to be a vertical direction is used for a description of the laser radar 310a.

As illustrated in FIG. 14A, the projection optical system 21 includes a coupling lens 22 disposed on an optical path of a laser beam from the LD, a reflection minor 24 disposed on an optical path of the laser beam passing through the coupling lens 22, and a rotary mirror 26 disposed as a deflector on an optical path of the laser beam reflected by the reflection minor 24. In this example, for miniaturization of the device, the reflection mirror 24 is disposed on the optical path between the coupling lens 22 and the rotary minor 26, and the optical path is folded back from the reflection mirror 24 to the rotary minor 26.

The laser beam emitted from the LD is shaped into a laser beam with a predetermined beam profile by the coupling lens 22, and the shaped laser beam is reflected by the reflection minor 24 and deflected around the Z-axis by the rotary minor 26.

The laser beam deflected around the Z-axis to cover a predetermined deflection area by the rotary minor 26 results in the laser beam projected from the projection optical system 21, which is the laser beam emitted from the laser radar 310a.

The rotary mirror 26 includes two or more reflection surfaces around the rotation axis (Z-axis). The rotary minor 26 reflects (deflects) the laser beam from the reflection mirror 24 while rotating the laser beam around the rotation axis, to perform one-dimensional scanning of the laser beam in a uniaxial horizontal direction (the Y-axis direction) to cover an effective scanning area corresponding to the deflection area. The deflection area and the effective scanning area are located on the +X side of the laser radar 310a. In the following, the rotational direction of the rotary minor 26 is called a mirror rotational direction.

As illustrated in FIGS. 14A to 14C, the rotary mirror 26 includes two opposed reflection surfaces. Alternatively, the rotary mirror 26 may include a single reflection surface or may include three reflection surfaces. Further, the rotary mirror 26 may include at least two reflection surfaces and may be arranged so that the reflection surfaces are placed at different angles to the rotation axis of the rotary minor and the scanning and detection area is changed to the Z-axis direction.

The optical scanning system 200 (see FIG. 13) may be configured to include the LD, the LD driver 12, and the projection optical system 21 and perform the scanning of the laser beam in the effective scanning area.

As illustrated in FIG. 14B, the light receiving optical system 31 includes the rotary mirror 26 which reflects the laser beam projected by the projection optical system 21 and reflected (dispersed) by an object in the effective scanning area, the reflection mirror 24 which reflects the laser beam from the rotary mirror 26, and an imaging optical system which is disposed on the optical path of the laser beam from the reflection mirror 24 to focus the laser beam on a time measurement photo diode (PD) 42 (which will be described later).

The optical path from the LD to the reflection mirror 24 and the optical path from the reflection mirror 24 to the time measuring PD 42 are illustrated in FIG. 14C.

As is apparent from FIG. 14C, the projection optical system 21 and the light receiving optical system 31 are disposed and overlapped in the Z-axis direction, and the rotary mirror 26 and the reflection mirror 24 are shared by the projection optical system 21 and the light receiving optical system 31. The relative positional difference between the light emission range of the object by the LD and the effective light receiving range of the time measuring PD 42 can be reduced, and the detection of the object can be stably carried out.

As illustrated in FIG. 14B and FIG. 13, the detection system 41 includes the time measuring PD 42 which receives the laser beam projected from the projection optical system 21 and reflected (dispersed) by the object in the effective scanning area through the light receiving optical system 31, a PD output detector 44 which detects a light reception signal which is a voltage signal based on the output current (current signal) of the time measuring PD 42, and a time measurement unit 45 which measures a time difference between a rise timing of the LD drive signal and a detection timing of the light reception signal by the PD output detector 44.

The laser beam projected from the projection optical system 21 and reflected (dispersed) by the object is led to the imaging optical system through the rotary mirror 26 and the reflection mirror 24, and focused on the time measuring PD 42 by the imaging optical system (see FIG. 14B). In FIG. 14B, for miniaturization of the device, the reflection mirror 24 is disposed between the rotary mirror 26 and the imaging optical system, and the optical path is folded back from the reflection mirror 24 to the rotary mirror 26. In this example, the imaging optical system includes two lenses (imaging forming lens). Alternatively, the imaging optical system may include a single lens or may include three or more lenses. A mirror optical system may be used instead.

As illustrated in FIG. 14A and FIG. 13, the sync system 51 includes a sync lens 52 which is disposed on the optical path of the laser beam which is emitted from the LD and reflected by the reflection mirror 24 through the coupling lens 22, and which is deflected by the rotary mirror 26 and reflected again by the reflection minor 24, a sync detection PD 54 which is disposed on the optical path of the laser beam through the sync lens 52, and the PD output detector 56 which detects an output signal of the sync detection PD 54.

Specifically, the reflection mirror 24 is disposed on the upstream side of the deflection area in the rotational direction of the rotary mirror 26, and the laser beam deflected to the upstream side of the deflection area by the rotary minor 26 enters the reflection minor 24. The laser beam which is deflected by the rotary minor 26 and reflected by the reflection minor 24 enters the sync detection PD 54 through the sync lens 52.

Note that the reflection minor 24 may be disposed on the downstream side of the deflection area in the rotational direction of the rotary mirror 26. The sync system 51 may be disposed on the optical path of the laser beam which is deflected by the rotary mirror 26 and reflected by the reflection mirror 24.

The sync detection PD 54 outputs a signal every time the laser beam reflected by the reflection surface of the rotary minor 26 during the rotation of the rotary minor 26 is received by the sync detection PD 54. Namely, the sync detection PD 54 periodically outputs a signal (sync signal).

In this way, the synchronous emission is performed to irradiate the sync detection PD 54 with the laser beam from the rotary mirror 26, and the rotation timing of the rotary mirror 26 can be obtained based on the laser beam reception timing of the sync detection PD 54.

The optical scanning of the laser beam in the effective scanning area can be carried out by performing the pulsed lighting of the LD when a predetermined time has elapsed after the synchronous emission of the LD is performed. Namely, the optical scanning of the laser beam in the effective scanning area can be carried out by performing the pulsed lighting of the LD at the end of the predetermined time from the timing which the sync detection PD 54 is irradiated with the laser beam.

Examples of photodetectors which are used for time measurement and synchronization detection include the above-described PD, an APD (avalanche photo diode), an SPAD (single photon avalanche diode) which is a Geiger mode APD. The APD and the SPAD have a sensitivity higher than the PD and are advantageous to increase detection accuracy and detection distance.

The operation of the PD output detector may include two operations: amplification of a light reception signal (voltage signal) and timing detection of a light reception signal. In the operation of the amplification of a light reception signal, the output current of the PD is converted into a voltage signal by using a signal amplifier, and then the voltage signal is amplified. In the operation of the timing detection of a light reception signal, a rise waveform portion of the light reception signal which exceeds a predetermined output level (threshold level) is detected by using a comparator. Namely, the PD output detector is configured to output a binary logic signal from the light reception signal by using the comparator.

The PD output detector 56 is configured to output a sync signal (the binary logic signal) to the measurement control unit 46 when the light reception signal (the rise waveform portion) of the sync detection PD 54 is detected.

The measurement control unit 46 is configured to generate an LD drive signal based on the sync signal received from the PD output detector 56, and output the LD drive signal to the LD driver 12 and the time measurement unit 45. Namely, the LD drive signal is a pulsed lighting signal (periodic pulsed signal) delayed from the sync signal.

The PD output detector 44 is configured to output a detection signal (rectangular pulsed signal) to the time measurement unit 45 when the light reception signal (the rise waveform portion) of the time measuring PD 42 is detected.

The time measurement unit 45 is configured to determine a time difference between the rise timing of the LD drive signal from the measurement control unit 46 and the rise timing of the detection signal from the PD output detector 44, and output the time difference to the measurement control unit 46 as a time measurement result.

The measurement control unit 46 is configured to compute a reciprocating distance to the object by converting the time measurement result from the time measurement unit 45 into a distance, and output distance data indicating one half of the reciprocating distance to the object recognition unit 310b.

Further, the measurement control unit 46 is configured to obtain a scanning position of the laser beam by the optical scanning system 200 at a predetermined timing between the rise timing of the LD drive signal and the detection timing of the light reception signal, and output the scanning position to the object recognition unit 310b as object direction data.

The object recognition unit 310b is configured to recognize where the object exists based on two or more pieces of distance data and direction data obtained for one scanning line or for two or more scanning lines from the measurement control unit 46, determine the three-dimensional position information of the object, and output the three-dimensional position information to the measurement control unit 46 as the object recognition result. The measurement control unit 46 is configured to transmit the three-dimensional position information to the ECU 350.

The ECU 350 is configured to perform steering control (e.g., automatic steering) and speed control (e.g., automatic braking) of the vehicle based on the received three-dimensional position information.

The coordinate conversion unit 801 of the ECU 350 is configured to convert the three-dimensional position information based on the coordinate system of the laser radar 310a and computed by the object recognition unit 310b into the coordinates based the coordinate system of the HUD device 100, and output the coordinates after the conversion to the HUD device 100 through the CAN.

The HUD device 100 is configured to generate a virtual image based on the three-dimensional position information of the object to be marked with the virtual image, obtained by the sensing unit 310, render the virtual image, and display the virtual image. The image data of the mark is generated so that the mark as the virtual image follows the position of the object in real time, and the geometric conversion is performed when necessary, so that the size of the mark is changed to be consistent in three dimensions with the apparent size of the object when viewed from the viewpoint position, and the virtual image is rendered based on the image data.

Next, an information display method performed by the information provision system 300 of Example 3 will be described with reference to FIG. 15.

As illustrated in FIG. 15, in step S1, the object recognition unit 310*b* obtains from the laser radar 310*a* the distance and the direction related to an object.

Subsequently, in step S2, the object recognition unit 310*b* computes the three-dimensional position information of the object based on the distance and the direction related to the object.

Subsequently, in step S3, the ECU 350 converts the three-dimensional position information of the object into the coordinates based on the coordinate system of the HUD device 100.

Subsequently, in step S4, the image data generation unit 804 generates the image data based on the three-dimensional position information obtained after the coordinate conversion.

Subsequently, in step S5, the image drawing unit 806 renders the image according to the image data.

Example 4

FIG. 16 illustrates a hardware and functional configuration of an information provision system 400 of Example 4 which is mounted on a moving object (e.g., a vehicle). FIG. 17 illustrates a hardware configuration of a sensing unit 410 of the information provision system 400.

As illustrated in FIG. 17, the sensing unit 410 of Example 4 includes a stereo camera 410*a* which is an imaging unit configured to capture a forward area of the vehicle as an imaging region, and an object recognition unit 410*b* configured to perform image processing to recognize a predetermined recognition object existing in the imaging region based on the image data captured by the stereo camera 410*a*.

The stereo camera 410*a* includes two camera units which are arrayed in parallel with each other: a first camera unit 110A that serves as a left eye, and a second camera unit 110B that serves as a right eye. Each of these camera units 110A and 110B includes a lens 115, an image sensor 116, and a sensor controller 117. As an example, the image sensor 116 may employ an image sensor made of a charge-coupled device (CCD) or a complementary metal-oxide semiconductor (CMOS). The sensor controller 117 is configured to perform exposure control and image readout control of the image sensor 116, the communication of the image sensor 116 with an external circuit, and transmission control of image data. The stereo camera 410*a* is disposed near a rear view minor of the front windshield 50 of the vehicle.

The object recognition unit 410*b* includes a data bus line 121, a serial bus line 122, a CPU 123, a FPGA 124, a ROM 125, a RAM 126, a serial interface 127, and a data interface 128.

The stereo camera 410*a* is connected to the object recognition unit 410*b* through the data bus line 121 and the serial bus line 122. The CPU 123 is configured to control the overall operations of the sensor controllers 117 of the stereo camera 410*a*, and control the overall operations, including the image processing, of the object recognition unit 410*b*.

The luminance image data of the images captured by the image sensors 116 of the camera units 110A and 110B are written to the RAM 126 of the object recognition unit 410*b* through the data bus line 121. The revision control data of the sensor exposure value from the CPU 123 or the FPGA 124, the revision control data of the image readout parameter, and various setting data are transmitted and received through the serial bus line 122.

The FPGA 124 is configured to perform the processing which requires real time manipulation of the image data stored in the RAM 126, such as the gamma correction, the distortion correction (parallel processing of right and left images), and the parallax operation by block matching, generate a parallax image, and write the parallax image data to the RAM 18. A recognition program for recognizing predetermined recognition objects, including solid objects such as vehicle or pedestrians, lane lines such as white lines on a road surface, and curbstones or median strips existing on road surface side parts, is stored in the ROM 125. The recognition program is an example of an image processing program.

The CPU 123 is configured to obtain through the data interface 128 CAN information, including a vehicle speed, an acceleration, a steering angle, a yaw rate, etc., from a not-illustrated sensor device via the CAN of the vehicle. Based on the recognition program stored in the ROM 125, the CPU 123 executes the image processing using the luminance image and the parallax image stored in the RAM 126, and recognizes the recognition objects, such as a preceding vehicle and a lane line. In this example, the CPU 123 obtains the three-dimensional position information of the object from the above-described parallax image as recognition result data.

The recognition result data are supplied to the ECU 350 and the HUD device 100 through the serial interface 127.

The ECU 350 is configured to perform the brake control, the speed control, and the steering control of the vehicle by using the recognition result data. For example, the cruise control to automatically make the vehicle track the preceding vehicle to maintain the distance between the two vehicles at a predetermined distance may be carried out, and the automatic brake control for preventing the collision with a front obstacle may be carried out.

The HUD device 100 is configured to generate image data based on the three-dimensional position information of the object to be marked with a virtual image (the recognition result data), and renders the virtual image based on the image data, and displays the virtual image.

Next, an information display method performed by the information provision system 400 of Example 4 will be described with reference to FIG. 18.

As illustrated in FIG. 18, in step S11, a front scene (object) is captured with the stereo camera 410*a*.

Subsequently, in step S12, a parallax image is generated based on the imaging result of the stereo camera 410*a* (the right and left captured images).

Subsequently, in step S13, the object recognition unit 410*b* computes the three-dimensional position information of the object based on the parallax image.

Subsequently, in step S14, the ECU 350 converts the three-dimensional position information of the object into the coordinates based on the coordinate system of the HUD device 100.

Subsequently, in step S15, the image data generation unit 804 generates image data based on the three-dimensional position information after the coordinate conversion.

Subsequently, in step S16, the image drawing unit 806 renders the image according to the image data.

Example 5

In an information provision system 500 of Example 5 which is mounted on a moving object (e.g., a vehicle), a sensing unit 510 includes a laser radar 510a, a one-eye camera 510b, and an object recognition unit 510c as illustrated in FIG. 19. Note that the sensing unit 510 of Example 5 may have a configuration which is the same as the above-described configuration of Example 3 or Example 4.

The laser radar 510a is a scanning type laser radar similar to the laser radar 310a of Example 3. The laser radar 510a is configured to transmit the distance data related to the object to the object recognition unit 510c.

The one-eye camera 510b is disposed to capture a front scene, and configured to transmit a captured image to the object recognition unit 510c.

The object recognition unit 510c is configured to determine the presence of an object (e.g., a preceding vehicle) based on the captured image from the one-eye camera 510b and the distance data from the laser radar 510a. When the presence of the object is determined, the object recognition unit 510c obtains the distance data related to the object from the laser radar 510a.

Note that the laser radar is configured to detect a near object at a short distance with a high degree of accuracy, and is invulnerable to the influences of day and night. On the other hand, the one-eye camera is configured to detect a distant object at a long distance. By using the one-eye camera, not only another vehicle but also a white line or a lamp of an oncoming vehicle can be recognized.

Hence, the sensing unit 510 is able to always perform the object recognition with high degree of accuracy by using both the laser radar 510a and the one-eye camera 510b.

Note that the presence of an object in the captured image from the one-eye camera 510b can be determined based on a difference in the amount of textures between a target area and its circumferential area of the captured image. Further, the direction data related to the object based on the coordinate system of the one-eye camera may be obtained from the captured image.

Next, an information display method performed by the information provision system 500 of Example 5 will be described with reference to FIG. 20.

As illustrated in FIG. 20, in step S21, a front scene is captured with the one-eye camera 510b. The captured image is transmitted to the object recognition unit 510c.

Subsequently, in step S22, object recognition is performed. Specifically, the object recognition unit 510c determines the presence of an object, and when there is an object (when a result of the determination is affirmative), the object recognition unit 510c obtains the distance data related to the object from the laser radar 510a.

Subsequently, in step S23, it is determined whether there are two or more objects. Here, the two or more objects may include a white line on a road surface, a stopped or running preceding vehicle, a road side curbstone, a guardrail, a wall, etc. When a result of the determination is negative, the control proceeds to step S24. When the result of the determination is affirmative, the control proceeds to step S27.

In step S24, the object recognition unit 510c computes the three-dimensional position information of the object based on the distance data from the laser radar 510a and the direction data obtained from the captured image from the one-eye camera 510b. In order to obtain the three-dimensional position information with high degree of accuracy, it is preferable that the laser radar 510a and the one-eye camera 510b are disposed in the vicinity of each other as close as possible. Further, it is preferable to convert the direction data of the object based on the coordinate system of the one-eye camera 510b into the direction data based on the coordinate system of the laser radar 510a. Note that the direction data may be obtained not only from the one-eye camera 510b but also from the laser radar 510a. In this case, the direction data of the object with a higher degree of accuracy may be obtained by using an average of the direction data from the one-eye camera 510b and the direction data from the laser radar 510a (both the direction data should be based on the same coordinate system).

Subsequently, in step S25, the ECU 350 performs the coordinate conversion of the three-dimensional position information of the object. Specifically, the coordinates of the object based on the coordinate system of the laser radar 510a are converted into the coordinates based on the coordinate system of the HUD device 100.

Subsequently, in step S26, the image data generation unit 804 generates image data based on the three-dimensional position information after the coordinate conversion. After step S26 is performed, the control proceeds to step S31.

In step S27, the object recognition unit 510c computes the three-dimensional position information of each of the objects based on the distance data from the laser radar 510a and the direction data obtained from the captured image from the one-eye camera 510b.

Subsequently, in step S28, the ECU 350 performs the coordinate conversion of the three-dimensional position information of each of the objects. Specifically, the coordinates of each object based on the coordinate system of the laser radar 510a are converted into the coordinates based on the coordinate system of the HUD device 100.

Subsequently, in step S29, the ECU 350 sets up a priority of each of the objects for calling viewer's attention. A high priority is set up for an object with the distance data indicating a short distance among the objects. The priority setting may be performed such that a high priority is set up for a moving object and a low priority is set up for a stationary object. By monitoring the three-dimensional position information of each object, it can be determined whether the object is a stationary object or a moving object.

Subsequently, in step S30, the image data generation unit 804 generates image data based on the three-dimensional position information after the coordinate conversion such that a difference in the priority between the objects can be recognized. As an example, the difference in the priority can be recognized by changing between the objects any of a color, a brightness, a shape, a size, and a position of a virtual image to mark each object. For example, when a highest priority is set up for a center line, the center line is marked by a red virtual image. When a second highest priority is set up for a curbstone, the curbstone is marked by a yellow virtual image. When a third highest priority is set up for a preceding vehicle, the preceding vehicle is marked by a green virtual image (see FIG. 21). Namely, an object to be observed with high priority is marked in a special color which calls viewer's attention.

Subsequently, in step S31, the image drawing unit 806 renders the image according to the image data.

In each of the above-described Examples 3 to 5, the obtained three-dimensional position information of the object may be utilized for both the vehicle control and the virtual image marking.

It is preferable that the above-described sensing unit is configured to select suitably any of the one-eye camera, the stereo camera, and the laser radar when a preceding vehicle or a pedestrian is marked by a virtual image according to the object to be marked. When the virtual image is superimposed on a road surface, and when the virtual image is displayed on a crossing according to the navigation information, the coordinates thereof are needed. For this purpose, the map information including a vehicle position, a crossing, etc., obtained by using the GPS, is needed.

When an indication of lane deviation warning is displayed, it is considered that such information is superimposed on a white line. In this case, obtaining the position of the white line by using the above-described sensing unit is needed. Similarly, obtaining the road state such as a curve or a slope, the information by the above-described sensing unit is needed.

The obtained information items are received by the HUD device 100 through the in-vehicle network as described above. The CAN (controller area network) is an example of the in-vehicle network. Generally, vehicle state information such as a vehicle speed, a steering angle, and a brake control in addition to the above-described position information is transmitted and received over the CAN, and such information may also be utilized for the superimposed display. In the HUD device 100 after such information is obtained, the image data generation unit 804 performs geometric conversion of the image to be drawn based on the obtained information, and the image drawing unit 806 performs rendering processing. The rendering processing is computed based on the field angle and the depression angle of the virtual image, and the distance.

In the foregoing, the example of the information display method performed by the HUD device 100 has been described.

In the above-described Example 3-5, obtaining the position information of the object to be marked is performed by the sensing unit. Alternatively, the HUD device 100 may be configured to receive the image information and the three-dimensional position information obtained by the sensing unit so that the HUD device 100 performs the detection processing. Moreover, it is also considered that a dedicated communication line other than the CAN is prepared and utilized.

The HUD device 100 according to the first embodiment described above provides an information display apparatus which emits an image forming light beam to the front windshield 50 and makes a virtual image visible through the front windshield, the information display apparatus being configured so that a difference between a convergence angle when viewing the virtual image through the front windshield 50 and a convergence angle when viewing a real object through the front windshield 50 is less than or equal to 1 degree to display the virtual image.

In this case, it is possible to prevent the deterioration of the visibility of the virtual image, such as changing the virtual image to a double image, with a simple configuration to set up the imaging position of the virtual image so that the above-described difference is less than or equal to 1 degree. Namely, it is possible to prevent the deterioration of the visibility of the virtual image and prevent the complexity of the device configuration.

As described above, the HUD device 100 is designed so that, when each of the scene and the display image (virtual image) viewed by the driver is reflected in the retinas of the driver's right and left eyes, the parallax angle between the scene and the display image is less than or equal to 1 degree. The HUD device 100 is able to perform the reality superimposition display without causing a double image, a feeling of fatigue, and displeasure. Namely, when the reality superimposition display is performed by the HUD device 100, the driver is able to recognize the display image (virtual image) while viewing the front scene, without causing a double image, a feeling of fatigue and displeasure.

On the other hand, PTL 1 listed above discloses an in-vehicle display system (superposition display technique) which projects an image forming light beam only on one eye of an image viewer in order to cancel a double image of the HUD device due to the two-eye parallax.

However, in the in-vehicle display system disclosed in PTL 1, a mechanism for projecting an image forming light beam only on one eye of the image viewer is needed additionally, which requires a complicated structure.

Namely, in the in-vehicle display system of PTL 1, improvements for preventing the deterioration of the visibility of the virtual image and improvements for preventing the complexity of the device configuration are required.

In the HUD device 100 of the first embodiment, when the distance from the viewpoint position to the imaging position of the virtual image is greater than 4 m, the deterioration of the visibility of the virtual image can be prevented certainly. In this case, the parallax angle is less than or equal to 1 degree even when an object at a position of 1000 m ahead is marked, and the driver is prevented from perceiving a feeling of fatigue and displeasure to the extent adequate for practical applications.

When the distance from the viewpoint position to the imaging position of the virtual image is less than 10 m, enlargement of the HUD device can be prevented. To increase the distance from the viewpoint position to the imaging position, increasing the optical path distance in the HUD device is needed, and enlargement of the HUD device is unavoidable.

When a virtual image which is consistent in three dimensions with a real object existing around a moving object viewed from an occupant of the moving object is displayed in the display area, the visibility of the virtual image can be improved.

When both a virtual image consistent in three dimensions with a real object existing around a moving object when viewed from the occupant of the moving object (the virtual image being obtained by geometric conversion to have a depth position) and a virtual image not consistent in three dimensions with the real object (the virtual image being obtained without geometric conversion) are displayed in the display area, the virtual image which requires having the depth position according to the real object, such as the virtual image for marking the real object, is obtained by geometric conversion and displayed, and virtual images (a speed of the moving object or measurement data of the moving object), such as virtual images of simple indications indicating numbers, characters, etc., may be displayed without geometric conversion. As a result, it is possible to provide adequately increased visibility of the virtual images regardless of the virtual image types. The virtual images displayed by the HUD device 100 may include not only two-dimensional virtual images but also one-dimensional and three-dimensional virtual images. The depth position of virtual image may be expressed by perspective drawing.

The types of virtual images displayed by the HUD device 100 may be limited to virtual images obtained by geometric conversion, such as virtual images to mark the objects, or may be limited to virtual images not requiring geometric conversion, such as simple indications indicating numbers and characters.

The HUD device 100 includes the vehicle information input unit 800 and the external information input unit 802 (which are a reception unit) to receive the object information (three-dimensional position information of an object) which is the obtained information related to the object. When the parameters of the virtual image (at least one of a size, a shape, a color, a brightness, and an imaging position of the virtual image) are adjusted according to the received information, the virtual image which is consistent in three dimensions with the object existing around the moving object (the vehicle) when viewed from the image viewer can be displayed (with an appropriate depth position), and it is possible to provide increased visibility of the virtual image. It is preferable to adjust the above parameters so that the depth perception according to the position, the shape, and the size of the object is generated.

Specifically, the HUD device 100 causes the reception unit to receive the three-dimensional position information from the three-dimensional position information acquisition unit (the object recognition unit 310b and the object recognition unit 410b) to obtain the three-dimensional position information of the object in the field of view of the image viewer. When at least one of the size, the shape, the color, the brightness, and the position of the virtual image displayed in the display area is adjusted based on the three-dimensional position information, it is possible to provide increased visibility of the virtual image. The size, the shape, the color, the brightness, and the position of the virtual image may be adjusted by the image data generation unit 804 which is configured to adjust the size, the shape, the color, the brightness, and the position of the portion corresponding to the virtual image in the image data when generating the image data.

The three-dimensional position information acquisition unit includes a measurement unit (e.g., a laser radar) configured to measure a distance and a direction related to an object, and an imaging unit (e.g., a stereo camera or a one-eye camera) configured to capture the object.

For example, the size, the shape, the color, the brightness, and the position of the virtual image in the display area may be adjusted as follows. The size, the shape, the color, the brightness, and the position of an image portion (a portion corresponding to the virtual image) in the image drawing region are adjusted when the image data of the image to be rendered is generated by the image data generation unit 804, and the image data is generated with the adjusted parameters, the generated image data is sent to the image drawing unit 806, so that the image drawing unit 806 renders the image according to the received image data.

Adjusting the above parameters of the virtual image is not necessarily required. When the parameters are not adjusted, obtaining or receiving the information related to the object is not needed. For example, when the virtual image for marking the object is not displayed and the adjustment of the above parameters of the virtual image is not needed, obtaining or receiving the information related to the object is not needed.

When the information related to the object includes at least one of a size, a shape, a color, a brightness, and a position of the object, the virtual image may be adjusted to be consistent with the object.

When the object is marked by the virtual image, calling attention to the object may be increased. A method of marking the object by the virtual image is to display the virtual image which is placed along at least a portion of the object.

When the virtual image (the marking) is displayed to follow the object, it is possible to cause the driver to recognize the position of the object in real time.

When it is determined whether to display the virtual image to the object (whether to mark the object by the virtual image) based on the obtained information related to the object, the virtual image may be displayed only if displaying the virtual image is needed according to the position, the size, and the type of the object (indicating that the object is a stationary object or a moving object). The case where displaying the virtual image to the object is not needed (or marking the object is not needed) may include a case where the parallax angle exceeds 1 degree, a case where the object is located far away from the viewpoint position, a case where the object is located at point-blank range from the viewpoint position, and a case where the object is located near the limit of the driver's visual field.

The HUD device 100 may be configured so that the reception unit receives traffic information (e.g., traffic congestion information and traffic rules) related to the moving object, and weather information, and the HUD device 100 displays the virtual image in the display area based on the above-described object information, so that the received information which is consistent in three dimensions with the object around the moving object viewed from the occupant of the moving object is displayed.

The HUD device 100 may be configured so that the reception unit receives position information of the moving object, and the HUD device 100 displays the virtual image in the display area based on the position information such that the virtual image is consistent in three dimensions with the object viewed from the occupant of the moving object. The position information of the moving object may be received from a GPS-carrying device (e.g., a car navigation system). Navigation information which is consistent in three dimensions with a road surface may be displayed in the display area based on the position information of the moving object. The virtual image as the marking which is consistent in three dimensions with the moving object may be displayed in the display area based on the position information and the object information of the moving object (other vehicles and pedestrians).

The HUD device 100 may be configured to include the image drawing unit 806 (image formation unit) configured to form an image by a light beam, and the concave mirror 40 (optical system) configured to lead the image forming light beam to the front windshield 50 (transmissive reflection member). In this case, the deterioration of the visibility of the virtual image can be prevented by using the general-purpose heads-up display device and the complexity of the device configuration can be prevented.

The image drawing unit 806 may be configured to include the optical scanning system 200 having the LD (light source) and the optical deflector 15 to deflect the light beam from the LD, and the LD driver 6111 to operate the LD according to the scanning position of the light beam by the optical scanning system 200. In this case, the emission of the LD in the display area where the virtual image is displayed is controlled. It is possible to provide increased visibility of the virtual image by increasing the contrast between the virtual image and the surrounding portion in the display area. It is possible to prevent the displaying of the outline (postcard) of the display area by lowering the contrast between the surrounding portion and the background of the display area.

In a moving object device including a moving object and the HUD device 100 mounted on the moving object, it is possible to provide a driver (image viewer) of the moving object with a safe and comfortable operating environment.

The information display method according to the first embodiment is an information display method for displaying information as a virtual image in a field of view, which is configured to display the virtual image such that a difference between the angle of inclination (convergence angle) between the lines of sight of the respective eyes when viewing the object in the field of view and the angle of inclination (convergence angle) between the lines of sight of the respective eyes when viewing the virtual image is less than or equal to 1 degree.

In this case, it is possible to prevent the deterioration of the visibility of the virtual image, such as changing the virtual image to a double image, with a simple information display method which is configured so that the above difference is less than or equal to 1 degree. Namely, the deterioration of the visibility of the virtual image can be prevented and the complexity of the device configuration can be prevented.

The information display method according to the first embodiment may further include a step of obtaining information related to the object, and a step of adjusting at least one of a size, a shape, a color, a brightness, and the imaging position of the virtual image based on the obtained information. In this case, it is possible to further increase the visibility of the virtual image.

Second Embodiment

Next, an information display method according to a second embodiment will be described with reference to FIG. 22.

The information display method is performed by the above-described information provision system 400 of Example 4 of the first embodiment. However, unlike the above-described Example 4, the imaging position of the virtual image in the HUD device according to the second embodiment is set up such that a parallax angle when viewing an object at a distance between 500 m and 1000 m from the viewpoint position exceeds 1 degree. Specifically, the distance L from the viewpoint position to the imaging position of the virtual image is set to be in a range between 1 m and 4 m (e.g., 3.5 m, see FIG. 8). A main controller including the CPU is configured to control overall operations of the information provision system 400 based on a program stored in the information provision system 400. The program when executed by the CPU (computer) causes the CPU to execute the information display method according to the second embodiment. The main controller may be implemented by a part of the ECU 350 or may be provided separately from the ECU 350.

As illustrated in FIG. 22, in step S41, a front scene is captured with the stereo camera 410a.

Subsequently, in step S42, a parallax image is generated based on the imaging result from the stereo camera 410a (right and left captured images).

Subsequently, in step S43, the object recognition unit 410b computes a parallax angle. Specifically, the object recognition unit 410b computes a difference between an angle of inclination (convergence angle) between the lines of sight of the respective eyes of the image viewer when viewing an object through the front windshield and an angle of inclination (convergence angle) between the lines of sight of the respective eyes of the image viewer when viewing a virtual image through the front windshield based on the three-dimensional position information of the object.

Subsequently, in step S44, it is determined whether the parallax angle is less than 1 degree. The above-described main controller determines whether the parallax angle is less than 1 degree. When the distance from the viewpoint position to the object is less than 500 m, the result of the determination is affirmative. When the distance from the viewpoint position to the object is equal to or greater than 500 m, the result of the determination is negative. When the result of the determination is affirmative, the control proceeds to step S45. When the result of the determination is negative, the information display method is terminated.

Subsequently, in step S45, the object recognition unit 410b computes the three-dimensional position information of the object based on the parallax image.

Subsequently, in step S46, the ECU 350 converts the three-dimensional position information of the object into the coordinates based on the coordinate system of the HUD device 100.

Subsequently, in step S47, the image data generation unit 804 generates image data of an image to be rendered based on the three-dimensional position information after the coordinate conversion.

Subsequently, in step S48, the image drawing unit 806 renders the image according to the image data. After the step S48 is performed, the information display method is terminated.

In the above-described second embodiment, the information provision system 300 of Example 3 or the information provision system 500 of Example 5 may be utilized. An information display method performed by a modification of the information provision system 300 of Example 3 is illustrated in FIG. 23. This information display method will be described with reference to FIG. 23.

Unlike the above-described Example 3, the imaging position of the virtual image in the HUD device according to the modification is set up such that a parallax angle when viewing an object at a distance between 500 m and 1000 m from the viewpoint position exceeds 1 degree. Specifically, the distance L from the viewpoint position to the imaging position of the virtual image is set to be in a range between 1 m and 4 m (e.g., 3.5 m, see FIG. 8). A main controller including the CPU is configured to control overall operations of the information provision system 300 based on a program stored in the information provision system 300. The program when executed by the CPU (computer) causes the CPU to execute the information display method illustrated in FIG. 23. The program when executed by the CPU (computer) causes the CPU to execute the information display method according to the modification illustrated in FIG. 23. The main controller may be implemented by a part of the ECU 350 or may be provided separately from the ECU 350.

As illustrated in FIG. 23, in step S51, the distance and the direction related to the object are obtained with the laser radar 310a.

Subsequently, in step S52, the object recognition unit 310b computes the three-dimensional position information of the object based on the distance and the direction related to the object.

Subsequently, in step S53, the object recognition unit 410b computes a parallax angle. Specifically, the object recognition unit 410b computes a difference between an angle of inclination (convergence angle) between the lines of sight of the respective eyes of the image viewer when viewing an object through the front windshield and an angle of inclination (convergence angle) between the lines of sight of the respective eyes of the image viewer when viewing a virtual image through the front windshield based on the three-dimensional position information of the object.

Subsequently, in step S54, it is determined whether the parallax angle is less than 1 degree. The above-described main controller determines whether the parallax angle is less than 1 degree. When the distance from the viewpoint position to the object is less than 500 m, the result of the determination is affirmative. When the distance from the viewpoint position to the object is equal to or greater than 500 m, the result of the determination is negative. When the result of the determination is affirmative, the control proceeds to step S55. When the result of the determination is negative, the information display method is terminated.

Subsequently, in step S55, the ECU 350 converts the three-dimensional position information of the object into the coordinates based on the coordinate system of the HUD device 100.

Subsequently, in step S56, the image data generation unit 804 generates image data of an image to be rendered based on the three-dimensional position information after the coordinate conversion.

Subsequently, in step S57, the image drawing unit 806 renders the image according to the image data. After the step S57 is performed, the information display method is terminated.

The information display method according to the above-described second embodiment and the modification displays information as a virtual image in a field of view and includes a step of obtaining object information including three-dimensional position information of an object in the field of view, a step of computing a difference between an angle of inclination (convergence angle) between the lines of sight of both eyes of an image viewer when viewing a virtual image through a front windshield and an angle of inclination (convergence angle) between the lines of sight of the respective eyes of the image viewer when viewing the object through the front windshield based on the object information and an imaging position of the virtual image, a step of determining whether the difference is less than or equal to 1 degree, and a step of displaying the virtual image when a result of the determination is affirmative. Note that the information including the three-dimensional position information of the object may include only the three-dimensional position information, and may further include information related to a size and a shape of the object.

In this information display method, the virtual image is displayed when the difference is less than or equal to 1 degree. It is possible to prevent the deterioration of the visibility of the virtual image, such as changing the virtual image to a double image. The deterioration of the visibility of the virtual image can be prevented and the complexity of the device configuration can be prevented.

Further, a non-transitory computer-readable recording medium according to the second embodiment and the modification stores a program which when executed by a computer causes the computer to execute an information display method for displaying information as a virtual image in a field of view, the information display method including steps of obtaining information including position information of a real object in the field of view; computing a difference between a convergence angle when viewing the virtual image through a transmissive reflection member and a convergence angle when viewing the real object through the reflection member based on the position information and an imaging position of the virtual image; determining whether the difference is less than or equal to 1 degree; and displaying the virtual image when a result of the determination is affirmative.

In this case, the virtual image is displayed when the difference is less than or equal to 1 degree, and it is possible to prevent the deterioration of the visibility of the virtual image such as occurrence of a double image. The deterioration of the visibility of the virtual image can be prevented and the complexity of the device configuration can be prevented.

In the HUD device 100 according to the above-described embodiments, the optical system includes the concave minor 40. Alternatively, the optical system may include a convex mirror, and may include a curved surface minor (a concave mirror or a convex mirror) and a fold-back minor disposed between the curved surface mirror and the screen 30.

In the HUD device 100 according to the above-described embodiments, the optical scanning unit includes the scanning minor 20. However, the optical scanning unit may include no scanning minor.

In the above-described Examples 3-5 of the first embodiment, and the second embodiment and its modification, the three-dimensional position information of the object is obtained. Alternatively, two-dimensional position information of an object (position information of the object on a two-dimensional flat surface perpendicular to the depth direction) excluding position information of the object in the depth direction (one-dimensional position information) may be obtained. The two-dimensional position information except the position information of the object in the depth direction may be obtained by using the laser radar or the camera, and a virtual image may be displayed based on the two-dimensional position information. Also in this case, marking of the object may be displayed according to the two-dimensional position except the position of the object in the depth direction.

In the above-described embodiments, the LD (edge emitting laser) is used as the light source. Alternatively, another laser, such as a surface emitting laser, may be used instead.

In the above-described embodiments, the HUD device as the information display apparatus is configured to form a color image. Alternatively, the HUD device as the information display apparatus may be configured to form a monochrome image.

The transmissive reflection member is not limited to the front windshield of the moving object in the above-described embodiments. Alternatively, the transmissive reflection member may be a side windshield, a rear windshield, etc. It is preferable that the transmissive reflection member is a windshield member disposed in a moving object which an image viewer gets in, and the image viewer is able to view the virtual image while viewing the exterior of the moving object.

In the above-described embodiments, the information display apparatus (the HUD device) is mounted on a moving object, such as a vehicle, an airplane, a marine vessel, an industrial robot, etc. Alternatively, the information display apparatus (the HUD device) may be mounted on an object. The object may include a moving object, a constantly installed object, and a transportable object.

The information display apparatus according to the present disclosure is applicable to not only the heads-up display (HUD) device but also a head mounted display device, a prompter device, and so on, in which a virtual image is superimposed on a scene or a sight to display necessary information that can be perceived by the visual sense of a person.

The specific numerical values and shapes indicated in the above-described embodiments are exemplary and explanatory, and variations and modifications thereof may be suitably made without departing from the scope of the present disclosure.

In the following, the thinking process of the inventors to create the above-described embodiments will be described.

The growing demand for an in-vehicle HUD device as a display device that is capable of recognizing information and alarms with least movement of a viewer's line of vision is expected and the engineering development has gained popularity. A virtual image created by the HUD device is superimposed on a front scene of a vehicle. The form of image information displayed based on a virtual image position of the HUD device and a driver's viewpoint position is geometrically converted. Hence, as commonly known in the art, the display image (virtual image) of the HUD device may be superimposed on the real world image, which is made visible to a driver.

However, in the case of the HUD device according to the related art, when the driver views the front scene during operation of the vehicle, the display image of the HUD device may be perceived by both eyes of the driver as a double image and it may be difficult for the driver to recognize the display image superimposed on the real world image, which gives the driver a feeling of fatigue and displeasure.

In view of the above problem, the above-described embodiments have been proposed such that the difference between the parallax of the display image (virtual image) of the HUD device and the parallax of the object, inputting to both the eyes of the driver, is minimized (below a predetermined value), and the driver is prevented from perceiving a double image, a feeling of fatigue, and displeasure when viewing the front scene and the display image superimposed on the front scene at a time.

The present application is based upon and claims the benefit of priority of Japanese Patent Application No. 2015-185240, filed on Sep. 18, 2015, the contents of which are incorporated herein by reference in their entirety.

REFERENCE SIGNS LIST

50 front windshield (transmissive reflection member)
100 HUD device (information display apparatus)
300, 400, 500 information provision system
310, 410, 510 sensing unit (information acquisition device, positional information acquisition device)

The invention claimed is:

1. An information display apparatus which is configured to emit an image forming light beam to a transmissive reflection member and allow an occupant of a moving object to view a virtual image via the transmissive reflection member, the information display apparatus comprising:
   circuitry configured to form an image which is viewed as a virtual image from the occupant of the moving object;
   an optical member configured to display the image formed by the circuitry on the transmissive reflection member so that a difference between a first convergence angle indicating an angle of inclination between lines of sight of both eyes of the occupant when viewing the virtual image and a second convergence angle indicating an angle of inclination between lines of sight of the eyes of the occupant when viewing a predetermined real object is less than or equal to 1 degree,
   wherein, in use, the predetermined real object is viewed from the occupant of the moving object through the transmissive reflection member such that the virtual image is superimposed over the predetermined real object.

2. The information display apparatus according to claim 1, wherein the optical member is configured to set up an imaging position of the virtual image so that the difference is less than or equal to 1 degree.

3. The information display apparatus according to claim 2, wherein the imaging position is an arbitrary position within a predetermined display area where the virtual image is formed.

4. The information display apparatus according to claim 3, wherein the image is an information provision image for providing navigation information for the occupant.

5. The information display apparatus according to claim 4, wherein the virtual image which is consistent in three dimensions with the predetermined real object existing around the moving object when viewed from the occupant, and the virtual image which is not consistent in three dimensions with the predetermined real object when viewed from the occupant coexist in a predetermined display area.

6. The information display apparatus according to claim 4, wherein the circuitry is configured to receive object information related to the predetermined real object existing around the moving object.

7. The information display apparatus according to claim 6, wherein the circuitry is configured to adjust at least one of a size, a shape, a color, a brightness, and a position of the virtual image based on the object information.

8. The information display apparatus according to claim 7, wherein the object information includes at least one of a size, a shape, a color, a brightness, and a position of the predetermined real object.

9. The information display apparatus according to claim 6, wherein the circuitry is configured to further receive traffic information related to the moving object, and the traffic information is displayed as the virtual image in the predetermined display area based on the object information so that the traffic information is superimposed over the predetermined real object when viewed from the occupant.

10. The information display apparatus according to claim 6, wherein the circuitry is configured to further receive position information of the moving object, and the virtual image is displayed in the display area based on the position information so that the virtual image is superimposed over the predetermined real object when viewed from the occupant.

11. The information display apparatus according to claim 4, wherein the predetermined real object is any one of a vehicle, a person, an obstacle, and a traffic sign which exist around the moving object.

12. The information display apparatus according claim 2, wherein a distance from a viewpoint position, which is a midpoint of the eyes of the occupant, to the imaging position is greater than or equal to 4 m and less than or equal to 10 m.

13. The information display apparatus according to claim 12, wherein a distance from the viewpoint position to the predetermined real object is greater than or equal to 2 m and less than or equal to 1000 m.

14. A moving object device comprising:
   a moving object; and
   the information display apparatus according to claim 1 and mounted on the moving object.

15. The information display apparatus according to claim 1, wherein the predetermined real object is a road surface ahead of the moving object.

16. The information display apparatus according to claim 1, wherein the predetermined real object is another moving object existing ahead of the moving object.

17. An information display apparatus which is configured to emit an image forming light beam to a transmissive reflection member and allow an occupant of a moving object to view a virtual image via the transmissive reflection member, wherein the information display apparatus is configured to compute a difference between a first convergence angle indicating an angle of inclination between lines of sight of both eyes of the occupant when viewing the virtual image via the transmissive reflection member and a second convergence angle indicating an angle of inclination between lines of sight of both eyes of the occupant when viewing a predetermined real object through the transmissive reflection member, based on information including position information of the predetermined real object and an imaging position of the virtual image, and configured to display the virtual image when the difference is less than or equal to 1 degree.

18. The information display apparatus according to claim 17,
wherein a distance from the viewpoint position to the imaging position is greater than or equal to 1 m and less than 4 m.

19. An information display method for displaying information as a virtual image in a field of view, comprising:

obtaining information including position information of a predetermined real object in the field of view;

computing a difference between a first convergence angle indicating an angle of inclination between lines of sight of both eyes of the occupant when viewing the virtual image via a transmissive reflection member and a second convergence angle indicating an angle of inclination between lines of sight of the eyes of the occupant when viewing the predetermined real object through the reflection member based on the position information and an imaging position of the virtual image;

determining whether the difference is less than or equal to 1 degree; and displaying the virtual image when a result of the determination is affirmative.

20. The information display method according to claim 19, further comprising:

adjusting at least one of a size, a shape, a color, a brightness, and the imaging position of the virtual image based on the information.

21. A non-transitory computer-readable recording medium storing a program which when executed by a computer causes the computer to execute the information display method according to claim 19.

* * * * *